United States Patent
Liu et al.

(10) Patent No.: US 12,258,465 B2
(45) Date of Patent: Mar. 25, 2025

(54) POLYETHYLENE COMPOSITION FOR HIGH PRESSURE RESISTANT PIPES WITH IMPROVED HOMOGENEITY

(71) Applicant: BOREALIS AG, Vienna (AT)

(72) Inventors: Yi Liu, Linz (AT); Victor Sumerin, Provoo (FI); Qizheng Dou, Linz (AT)

(73) Assignee: BOREALIS AG, Vienna (AT)

( * ) Notice: Subject to any disclaimer, the term of this patent is extended or adjusted under 35 U.S.C. 154(b) by 735 days.

(21) Appl. No.: 17/287,579

(22) PCT Filed: Oct. 22, 2019

(86) PCT No.: PCT/EP2019/078712
§ 371 (c)(1),
(2) Date: Apr. 22, 2021

(87) PCT Pub. No.: WO2020/088987
PCT Pub. Date: May 7, 2020

(65) Prior Publication Data
US 2021/0317290 A1    Oct. 14, 2021

(30) Foreign Application Priority Data

Oct. 31, 2018  (EP) ..................................... 18203693

(51) Int. Cl.
| C08L 23/08 | (2006.01) |
| C08F 2/00 | (2006.01) |
| C08F 4/02 | (2006.01) |
| C08F 210/16 | (2006.01) |
| C08L 23/0807 | (2025.01) |

(52) U.S. Cl.
CPC .......... *C08L 23/0815* (2013.01); *C08F 2/001* (2013.01); *C08F 4/022* (2013.01); *C08F 210/16* (2013.01); *C08L 2203/18* (2013.01); *C08L 2205/025* (2013.01); *C08L 2314/02* (2013.01)

(58) Field of Classification Search
CPC ...... C08L 23/0815; C08F 2/001; C08F 4/022; C08F 210/16
See application file for complete search history.

(56) References Cited

U.S. PATENT DOCUMENTS

| 3,242,150 A | 3/1966 | Scoggin |
| 3,324,093 A | 6/1967 | Alleman |
| 3,374,211 A | 3/1968 | Marwil |
| 3,405,109 A | 10/1968 | Rohlfing |
| 4,107,414 A | 8/1978 | Giannini et al. |
| 4,186,107 A | 1/1980 | Wagner |
| 4,226,963 A | 10/1980 | Giannini |
| 4,347,160 A | 8/1982 | Epstein |
| 4,382,019 A | 5/1983 | Greco |
| 4,435,550 A | 3/1984 | Ueno |
| 4,465,782 A | 8/1984 | McKenzie |
| 4,472,524 A | 9/1984 | Albizzati |
| 4,473,660 A | 9/1984 | Albizzati |
| 4,522,930 A | 6/1985 | Albizzati |
| 4,530,912 A | 7/1985 | Pullukat |
| 4,532,311 A | 7/1985 | Fulks et al. |
| 4,532,313 A | 7/1985 | Matlack |
| 4,543,399 A | 9/1985 | Jenkins, III et al. |
| 4,560,671 A | 12/1985 | Gross et al. |
| 4,578,879 A | 4/1986 | Yokoyama et al. |
| 4,581,342 A | 4/1986 | Johnson et al. |
| 4,582,816 A | 4/1986 | Miro |
| 4,621,952 A | 11/1986 | Aronson |
| 4,657,882 A | 4/1987 | Karayannis et al. |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 5,539,067 A | 7/1996 | Parodi et al. |

(Continued)

FOREIGN PATENT DOCUMENTS

| CN | 103827198 A | 5/2014 |
| CN | 105874002 A | 8/2016 |

(Continued)

OTHER PUBLICATIONS

Office Action with English translation for Chinese Patent Application No. 2019800699835 dated Sep. 30, 2022, 14 pages.
Geldart et al. "The Design of Distributors for Gas-Fluidized Beds" Powder Technology, vol. 42, 1985, pp. 67-78.
Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.
Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.

(Continued)

*Primary Examiner* — Robert C Boyle
*Assistant Examiner* — Patrick Loen Benitez
(74) *Attorney, Agent, or Firm* — Lowenstein Sandler LLP

(57) ABSTRACT

The present invention relates to a polyethylene composition comprising a base resin having a density of from 952.0 kg/m³ to 960.0 kg/m³, determined according to ISO 1183, wherein the polyethylene composition has a melt flow rate $MFR_{21}$ (190° C., 21.16 kg), of from 1.0 to 7.5 g/10 min, determined according to ISO 1133, a complex viscosity at a frequency of 0.05 rad/s eta0.05 of from 750 kPa #s to 1900 kPa #s, determined according to ISO 6721-1 and ISO 6721-10, and a white spot rating of not more than 12.0, determined according to ISO 18553, a polyethylene composition obtainable by a multi-stage process, a process for producing said polyethylene composition, an article, such as a pipe or pipe fitting, comprising said polyethylene composition and the use of said polyethylene composition for the production of an article.

15 Claims, 1 Drawing Sheet

(56) References Cited

U.S. PATENT DOCUMENTS

| | | | |
|---|---|---|---|
| 5,618,771 A | 4/1997 | Parodi et al. | |
| 2009/0252910 A1* | 10/2009 | Baeckman | C08L 23/06 526/348 |
| 2010/0178443 A1 | 7/2010 | Backman | |
| 2017/0152376 A1* | 6/2017 | Liu | B29C 48/9115 |

FOREIGN PATENT DOCUMENTS

| | | | | |
|---|---|---|---|---|
| CN | 108699308 A | 10/2018 | | |
| EP | 45975 A2 | 2/1982 | | |
| EP | 45976 A2 | 2/1982 | | |
| EP | 45977 A2 | 2/1982 | | |
| EP | 188125 A2 | 7/1986 | | |
| EP | 250169 A2 | 12/1987 | | |
| EP | 428054 A1 | 7/1990 | | |
| EP | 479186 A1 | 4/1992 | | |
| EP | 560035 A1 | 9/1993 | | |
| EP | 579426 A1 | 1/1994 | | |
| EP | 600414 A1 | 6/1994 | | |
| EP | 684871 A1 | 12/1995 | | |
| EP | 696293 A1 | 2/1996 | | |
| EP | 699213 A1 | 3/1996 | | |
| EP | 707513 A1 | 4/1996 | | |
| EP | 721798 A2 | 7/1996 | | |
| EP | 810235 A2 | 12/1997 | | |
| EP | 891990 A2 | 1/1999 | | |
| EP | 1146079 A1 | 10/2001 | | |
| EP | 1310295 A1 | 5/2003 | | |
| EP | 1415999 A1 | 5/2004 | | |
| EP | 1460105 A1 | 9/2004 | | |
| EP | 1781712 B1 | 4/2005 | | |
| EP | 1591460 A1 | 11/2005 | | |
| EP | 1719788 A1 | 11/2006 | | |
| EP | 1922342 A1 | 5/2008 | | |
| EP | 1987097 B1 | 11/2008 | | |
| EP | 2021385 B1 | 11/2009 | | |
| EP | 2610271 A1 | 7/2013 | | |
| EP | 2743305 A1 | 6/2014 | | |
| EP | 2860201 A1 | 4/2015 | | |
| EP | 2860204 A1 | 4/2015 | | |
| EP | 2743305 B1 * | 7/2015 | | C08L 23/06 |
| EP | 2966123 A1 | 1/2016 | | |
| EP | 3037436 A1 * | 6/2016 | | B29B 9/12 |
| WO | 8707620 A1 | 12/1987 | | |
| WO | 9219653 A1 | 11/1992 | | |
| WO | 9219658 A1 | 11/1992 | | |
| WO | 9219659 A1 | 11/1992 | | |
| WO | 9221705 A1 | 12/1992 | | |
| WO | 9311165 A1 | 6/1993 | | |
| WO | 9311166 A1 | 6/1993 | | |
| WO | 9319100 A1 | 9/1993 | | |
| WO | 9425495 A1 | 11/1994 | | |
| WO | 9532994 A1 | 12/1995 | | |
| WO | 9736939 A1 | 10/1997 | | |
| WO | 9812234 A1 | 3/1998 | | |
| WO | 9933842 A1 | 7/1999 | | |
| WO | 0029452 A1 | 5/2000 | | |
| WO | 03000754 A1 | 1/2003 | | |
| WO | 03000755 A2 | 1/2003 | | |
| WO | 03000756 A1 | 1/2003 | | |
| WO | 03000757 A1 | 1/2003 | | |
| WO | 2004029112 A1 | 4/2004 | | |
| WO | 2005087261 A2 | 9/2005 | | |
| WO | 2005118655 A1 | 12/2005 | | |
| WO | 2006063771 A1 | 6/2006 | | |
| WO | 2007025640 A1 | 3/2007 | | |
| WO | 2011092264 A1 | 8/2011 | | |
| WO | 2012007430 A1 | 1/2012 | | |
| WO | 2014096296 A1 | 6/2014 | | |
| WO | 2016097193 A1 | 6/2016 | | |
| WO | 2016124676 A1 | 8/2016 | | |
| WO | 2017207493 A1 | 12/2017 | | |

OTHER PUBLICATIONS

Heino, et al., "The Influence of Molecular Structure on Some Rheological Properties of Polyethylene", Annual Transactions of the Nordic Rheology Society, 1995, pp. 71-73.

Klimke, et al., "Optimisation and Application of Polyolefin Branch Quantification by Melt-State 13C NMR Spectroscopy," Macromolecular Chemistry and Physics, vol. 207, 2006, pp. 382-395.

Huang et al. "Slow Crack growth in blends of HDPE and UHMWPE" Department of Materials Science and Engineering, University of Pennsylvania, Polymer, 1992 Volume 33, No. 14, 9 pages.

Geldart, "Gas-Fluidization Technology", vol. 42, 1986, 24 pages.

Filip, et al., "Heteronuclear decoupling under fast MAS by a rotor-synchronized Hahn-echo pulse train," Journal of Magnetic Resonance, vol. 176, 2005, pp. 239-243.

Castignolles, et al., "Detection and Quantification of Branching in Polyacrylates by Size-Chromatography (SEC) and Melt-State 13c NMR Specroscopy," Polymer 50, 2009, pp. 2373-2383.

Definition of terms relating to the non-ultimate mechanical properties of polymers, Pure & Appl. Chem. Vol. 70, No. 3, pp. 701-754, 1998.

International Search Report for PCT/EP2019/078712 mailed Jan. 21, 2020, 11 pages.

International Preliminary Report on Patentability for PCT/EP2019/078712 mailed Feb. 19, 2021, 6 pages.

European Search Report for 18203693.9 mailed May 9, 2019, 6 pages.

Baumgaertel, et al. "Determination of Discrete Relaxation and Retardation Time Spectra from Dynamic Mechanical Data", Rheologica Acta, vol. 28, 1989, pp. 511-519.

Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.

Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.

Randall, et al., "A Review of High Resolution Liquid 13Carbon Nuclear Magnet Resonance Characterizations of Ethylene-Based Polymers", Rev. Macromol. Chem. Phys. 1989, C29, 201-317.

Scheirs, et al. "PE100 Resins for Pipe Application: Continuing the Development into the 21st Century", Elisevier Science Ltd, Trip vol. 4, No. 12, Dec. 1996, pp. 408-415.

Dealy et al., "Structure and Rheology of Molten Polymers", Hanser 2006, pp. 119.

Written Opinion of International Preliminary Examining Authority for PCT/EP2019/078712 mailed Sep. 9, 2020, 4 pages.

Office Action for United Arab Emirates Patent Application No. P6000650/2021, Dec. 23, 2023, 8 pages.

* cited by examiner

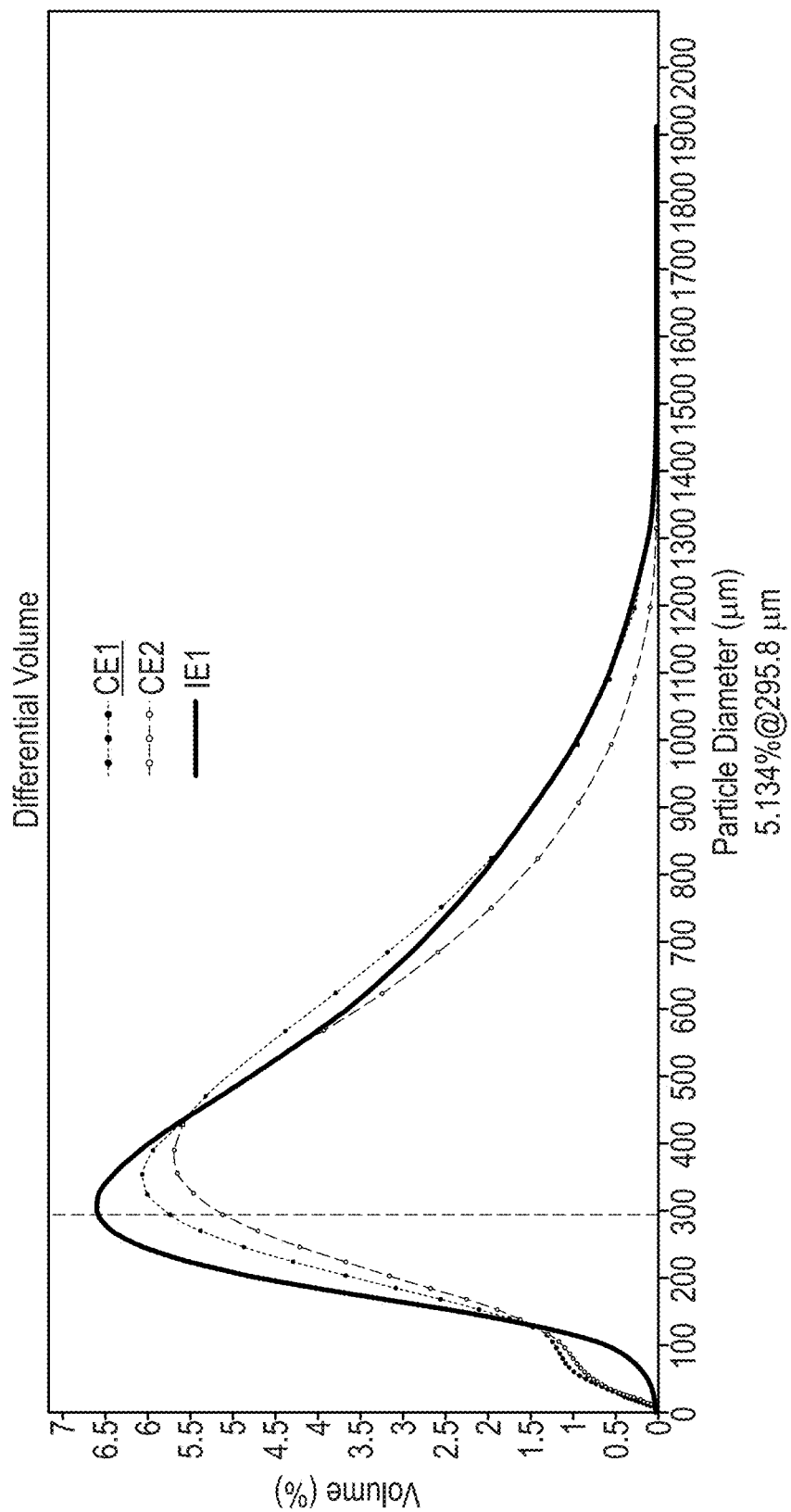

POLYETHYLENE COMPOSITION FOR HIGH PRESSURE RESISTANT PIPES WITH IMPROVED HOMOGENEITY

CROSS-REFERENCE TO RELATED APPLICATION(S)

This application is a national phase of International Application No. PCT/EP2019/078712, filed on Oct. 22, 2019, which claims the benefit of European Patent Application No. 18203693.9, filed on Oct. 31, 2018. The contents of these applications are hereby incorporated by reference in their entirety.

FIELD OF THE INVENTION

The present invention relates to a polyethylene composition suitable for high pressure resistant pipes with improved homogeneity, a process for producing such a polyethylene composition, and an article, such as a pipe or pipe fitting, comprising said polyethylene composition and the use of said polyethylene composition for the preparation of an article, preferably a pipe or pipe fitting.

BACKGROUND OF THE INVENTION

Numerous polyethylene compositions for the production of pipes are known. Pipe materials are classified such as PE80 or PE100. The service temperature for PE100 is 20° C. The ISO 9080 classification guarantees that a PE100 material will have a lifetime of at least 50 years at 20° C. using internal stress of 10 MPa.

EP 1987097 in the name of Chevron Phillips Chemical Company discloses a polyethylene suitable for pipes having a pellets' density equal to or greater than 947 kg/m$^3$ and a MFR$_{21}$, (ASTM D1238, 21.6 kg load) of 1 to 30 g/10 min. The exemplified resins produced with dual-site supported metallocene catalysts showed weight average molecular weights of 278 to 346 kg/mol at Mw/Mn of from 30.5 to 35.1 and pellets' density from 951 to 954 kg/m$^3$. EP 1781712 in the name of UNIVATION TECH LLC [US] discloses various compositions, including but not limited to a high strength bimodal polyethylene composition having a density of 940 kg/m$^3$ or more, the composition comprising a high molecular weight polyethylene component having a higher weight average molecular weight (HwHMW) and a low molecular weight polyethylene component having a lower weight average molecular weight (HwLMW), wherein the ratio of the higher weight average molecular weight to the lower weight average molecular weight (MwHMW:MwLMW) is 30 or more; and the composition qualifies as a PE 100 material such that in accordance with ISO 1167 a pipe formed from the composition that is subjected to internal pipe resistance has an extrapolated stress of 10 MPa or more when the internal pipe resistance curve is extrapolated to 50 or 100 years in accordance with ISO 9080:2003. The exemplified resins were produced with dual-site supported metallocene catalysts.

EP 1922342 of the Ineos group discloses compositions having a natural density of 935 up to 956 kg/m$^3$ at a melt flow rate (5 kg load) of 0.15 to 0.5 g/10 min, the comonomer being 1-hexene and a dynamic viscosity at 100 rad/s, 190° C. of no more than 2500 Pa·s.

EP 1146079 in the name of Borealis Technology Oy discloses compositions having a powder density of at least 953 kg/m$^3$ and a final density of the composition in the range of 955 to 965 kg/m$^3$, a MFR$_5$ of 0.15 to 0.40 g/10 min. Pipes made from the compositions meet a design stress of at least 9.0 MPa (PE112). The compositions are composed of two components, whereby the low molecular weight component is an ethylene homopolymer having a MFR$_2$ of 350 to 1500 g/10 min and is present in an amount of 42 to 55 wt.-%.

EP 2021385 of the Ineos group discloses an uncompounded polyolefin powder, having a particle size distribution such that D95 is less than 355 µm and (D90–D10)/D50 is less than 1.2, where D95, D90, D50 and D10 are defined such that 95 wt %, 90 wt %, 50 wt % or 10 wt % of the polymer particles have a diameter of less than D95, D90, D50 and D10 respectively.

EP1719788 in the name of Borealis Technology Oy discloses a multimodal polyethylene resin comprising two polyethylene fractions having different molecular weight which, when taken directly from the reactor after the final polymerisation step, has a narrow particle size distribution. A narrow particle size distribution indicated by PSD95/5 values equal to or less than 12. This means that less undesirable too small and too big particles are obtained. Thus, i.a. fluidisation of the polymer powder in the reactor and homogeneity of the final resin are improved. The exemplified resins have a powder density of 943 up to 949 kg/m$^3$.

According to ISO 9080, polyethylene pipes are classified by their minimum required strength, i.e. their capability to withstand different hoop stresses during 50 years at 20° C. without fracturing. Thereby, pipes withstanding a hoop stress of 8.0 MPa (MRS$_{8.0}$) are classified as PE80 pipes, and pipes withstanding a hoop stress of 10.0 MPa (MRS$_{10.0}$) are classified as PE100 pipes. The next evolutionary step in polyethylene pipe development will be PE125 pipes withstanding a hoop stress of 12.5 MPa (MRS$_{12.5}$). To meet the PE80 requirements with multimodal resins manufactured by conventional Ziegler-Natta catalysts, the powder density needs to be at least 940 kg/m$^3$ and to meet PE100 requirements the powder density needs to be above 945 kg/m$^3$. To meet PE125 requirements an even higher density than for PE100 is needed.

Besides the high density, multimodal polyethylene resins for the production of pipes should exhibit excellent mechanical and impact properties while maintaining good processability. In general, these properties depend on the molecular weight of the polyethylene composition. The higher the molecular weight, the greater are e.g. impact strength, sagging behavior and rapid crack propagation properties. Accordingly, improved impact and mechanical properties can be achieved by increasing the molecular weight of at least one polyethylene fraction in a polyethylene composition.

However, this usually leads to a loss in homogeneity due to an increased difference in the viscosity between the higher and the lower molecular weight fraction. These compatibility problems particularly apply in the case an ultra-high molecular weight fraction (UHMW) is included into a polyethylene composition for further improving the impact mechanical properties, as it becomes more and more difficult to homogenize the ultra-high molecular weight particles into the polymer matrix.

These ultra-high molecular weight particles then occur as so-called "white spots" in the compounded material and may cause roughness or surface defects in the articles, such as pipes, produced from the polyethylene composition. That is, low degrees of homogeneity adversely affect the surface properties of the polymer composition.

The beneficial effect of including an UHMW polyethylene fraction into HDPE via extrusion has been investigated and carried out using a co-rotating twin screw extruder by Hung and Brown (Polymer, 1992, 33, 2989-2997). However, although the UHMW polyethylene particles where found to be well bonded in the matrix, helping to slow down the rate of crack propagation, the UHMW polyethylene was found to remain in separate domains with no evidence of "melting" into the HDPE matrix.

EP 2860204 A1 and EP 2860201 A1, both in the name of Borealis AG, disclose polyethylene compositions suitable for pipes meeting PE125 requirements which comprise a UHMW component polymerized in the polymerization stage. These polyethylene compositions, although showing a good homogenization of the UHMW component into the polymeric melt still need improvement in regard of pressure resistance especially at elevated temperatures.

Thus, there is still a need for polyethylene compositions comprising a multimodal ethylene copolymer with a high density for the production of pipes which show improved balance of properties regarding processability, mechanical properties such as tensile properties and sagging behavior as well as slow crack propagation properties together with a good homogeneity.

SUMMARY OF THE INVENTION

The present invention relates to a polyethylene composition comprising a base resin having a density of from 952.0 kg/m$^3$ to 960.0 kg/m$^3$, determined according to ISO 1183, and the polyethylene composition has a melt flow rate MFR$_{21}$ (190° C., 21.16 kg), of from 1.0 to 7.5 g/10 min, determined according to ISO 1133, a complex viscosity at a frequency of 0.05 rad/s eta$_{0.05}$ of from 750 kPa·s to 1900 kPa·s, determined according to ISO 6721-1 and ISO 6721-10, and a white spot rating of not more than 12.0, determined according to ISO 18553.

It has surprisingly been found that by increasing the complex viscosity at a frequency of 0.05 rad/s eta$_{0.05}$ of polyethylene base resins having a high density to the claimed range the pressure resistance and slow crack propagation resistance especially at elevated temperatures can be significantly improved while maintaining suitable processability, good mechanical properties such as tensile properties and sagging behavior as well as a good homogeneity.

The present invention further relates to a polyethylene composition obtainable by a multistage process, the multistage process comprising the following steps:
a) polymerizing ethylene in the presence of a solid Ziegler-Natta catalyst component in a first reactor for obtaining a first intermediate material,
b) transferring the first intermediate material to a second reactor
  (i) feeding ethylene to the second reactor
  (ii) further polymerizing the first intermediate material for obtaining a second intermediate material, the second intermediate material having a melt flow rate MFR$_2$ (190° C., 2.16 kg) of 5.0 to 250 g/10 min; and
c) transferring the second intermediate material to a third reactor
  (i) feeding ethylene to the third reactor
  (ii) further polymerizing the second intermediate material for obtaining a third intermediate material, the third intermediate material having a melt flow rate MFR$_2$ (190° C., 2.16 kg) of 80 to 250 g/10 min;
d) transferring the third intermediate material to a fourth reactor
  (i) feeding ethylene and comonomer selected from alpha-olefins having from 4 to 12 carbon atoms to the fourth reactor
  (ii) further polymerizing the third intermediate material in the presence of a silane type external donor
  for obtaining a base resin having density of from 952.0 kg/m$^3$ to 960.0 kg/m$^3$, determined according to ISO 1183, and
e) extruding the base resin into a polyethylene composition having a melt flow rate MFR$_{21}$ (190° C., 21.16 kg), of from 1.0 to 7.5 g/10 min, determined according to ISO 1133, a complex viscosity at a frequency of 0.05 rad/s eta$_{0.05}$ of from 750 kPa·s to 1900 kPa·s, determined according to ISO 6721-1 and ISO 6721-10, and a white spot rating of not more than 12.0, determined according to ISO 18553.

The present invention further relates to a process for producing the polyethylene composition as defined above or below, wherein the base resin is polymerized in a multistage process in at least four sequential reactor stages in any order in the presence of a solid Ziegler-Natta catalyst component.

Still further, the present invention relates to an article, such as a pipe or pipe fitting, comprising the polyethylene composition as defined above or below.

Additionally, the present invention relates to the use of a polyethylene composition as defined above or below for the production of an article.

Definitions

A polyethylene composition according to the present invention denotes a composition comprising one or more polymers, wherein the molar amounts of the components of the polymer composition add up to a total amount of at least 50 mol-% ethylene monomer units.

The term 'base resin' denotes the polymeric part of the polyethylene composition without fillers such as carbon black. A person skilled in the art will understand that the measurements as to the base resin require the presence of stabilizers.

In addition to the base resin, usual additives for utilization with polyolefins, such as pigments (e.g. carbon black), stabilizers (e.g. antioxidant agents), antacids and/or anti-UV's, antistatic agents and utilization agents (such as processing aid agents) may be present in the polyethylene composition. Preferably, the amount of these additives is 10 wt % or below, more preferably 9 wt % or below, most preferably 7 wt % or below, of the composition.

Preferably, the composition comprises carbon black in an amount of 8 wt % or below, more preferably in an amount of 1 to 6 wt %, of the total composition.

Further preferred, the amount of additives different from carbon black is 1 wt % or less, more preferably 0.5 wt % or less.

An 'ethylene homopolymer' denotes a polymer consisting essentially of ethylene monomer units. Due to the requirements of large-scale polymerization it may be possible that the ethylene homopolymer includes minor amounts of comonomer units, which usually is below 0.05 mol %, most preferably below 0.01 mol % of the ethylene homopolymer.

A polymer is denoted 'ethylene copolymer' if the polymer is derived from ethylene monomer units and at least one alpha-olefin comonomer. The alpha-olefin conomomer preferably is selected from alpha-olefin conomoners with 4 to 12 carbon atoms, more preferably 4 to 8 carbon atoms. Suitable alpha-olefin comonomer species are 1-butene, 1-hexene, 4-methyl-1-pentene, 1-octene or their mixtures. Preferred are 1-butene and 1-hexene.

A polyethylene composition or base resin comprising more than one fraction differing from each other in at least one property, such as weight average molecular weight or comonomer content, is called "multimodal". If the multimodal polyethylene composition or base resin includes two different fractions, it is called "bimodal" and, correspondingly, if it includes three different fractions, it is called "trimodal". The form of the molecular weight distribution curve, i.e. the appearance of the graph of the polymer weight fraction as function of its molecular weight, of such a multimodal polyethylene composition or base resin will show two or more maxima depending on the modality or at least be distinctly broadened in comparison with the curves of the individual fractions.

The 'polydispersity index' PI is a rheological measurement of the broadness of the molecular weight distribution curve.

All rheological measurements can be performed with the base resin and with the polyethylene composition. As a matter of definition, all rheological properties shall preferably also apply to the polyethylene composition.

FIGURES

FIG. 1 illustrates the particle size distribution curves as a relation of volume to particle size of examples IE1, CE1 and CE2.

DETAILED DESCRIPTION

Base Resin

The base resin according to the present invention preferably comprises, more preferably consists of, a copolymer of ethylene with at least one alpha olefin comonomer having from 4 to 12 carbon atoms.

The base resin may comprise other polymers differing from the copolymer of ethylene with at least one alpha olefin comonomer having from 4 to 12 carbon atoms. It is, however, preferred that the base resin consists of the copolymer of ethylene with at least one alpha olefin comonomer having from 4 to 12 carbon atoms.

Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-hexene.

The ethylene copolymer may further comprise further comonomer units different from alpha olefin comonomers such as dienes, polar comononers or silicon containing comonomers. It is, however, preferred that the ethylene copolymer only contains alpha olefin monomers as comonomer units.

It is especially preferred that the ethylene copolymer contains 1-butene and/or 1-hexene as comonomer units.

In one embodiment, the ethylene copolymer comprises one alpha-olefin comonomer. In this embodiment the alpha-olefin comonomer preferably is 1-hexene. More preferably the ethylene copolymer preferably is an ethylene/1-hexene copolymer.

In another embodiment the ethylene copolymer comprises more than one, preferably two, alpha-olefin comonomers. In this embodiment the alpha-olefin comonomer preferably are at least 1-butene and 1-hexene. More preferably the ethylene terpolymer preferably is an ethylene/1-butene/1-hexene terpolymer.

The content of units derived from the at least one alpha olefin comonomer having from 4 to 12 carbon atoms in the base resin is preferably 0.01 to 0.50 mol %, more preferably of from 0.02 to 0.40 mol % and most preferably of from 0.05 to 0.35 mol %, based on the monomer content of the base resin.

Density (Base Resin)

The base resin according to the present invention has a density of equal to or more than 952.0 kg/m$^3$ and equal to or less than 960.0 kg/m$^3$. Preferably the density of the base resin is equal to or more than 953.0 kg/m$^3$ and equal to or less than 959.0 kg/m$^3$, more preferably of equal to or more than 954.0 kg/m$^3$ and equal to or less than 958.0 kg/m$^3$.

Particle Size and Particle Size Distribution

The base resin preferably has a particle size distribution of polymer particles D95/D5 of not more than 15.0, more preferably of not more than 10.0 and most preferably of not more than 7.5. The lower limit of the particle size distribution is suitably 1.5.

Further, the base preferably has a span of the particle size distribution of polymer particles of not more than 1.75, more preferably of not more than 1.70 and most preferably of not more than 1.65. The lower limit of the particle size distribution is suitably 0.5.

The base resin preferably has a particle size D5 of at least 50 μm, more preferably of at least 70 μm and most preferably of at least 90 μm. The upper limit of the particle size D5 is suitably 250 μm.

The base resin preferably has a particle size D10 of at least 75 μm, more preferably of at least 100 μm and most preferably of at least 120 μm. The upper limit of the particle size D5 is suitably 500 μm.

A narrow particle size distribution of the base resin is an indication of an improved homogeneity of the reactor-made base resin. In the present invention the narrow particle size distribution is preferably obtained because the D5 and D10 particle sizes of the particles of the base resin are rather high.

The base resin preferably comprises at least four ethylene homo- or copolymer fractions (A), (B), (C) and (D) which differ in their weight average molecular weight Mw and/or their comonomer content.

Fraction (A) preferably is an ethylene homopolymer.

Preferably, fraction (A) has a high weight average molecular weight Mw which can be seen from its low melt flow rate MFR$_5$.

Thus, fraction (A) preferably qualifies as high molecular weight (HMW) fraction.

Fraction (A) is preferably present in an amount of 0.5 to 10 wt %, more preferably in an amount of 1.0 to 7.5 wt % and most preferably in an amount of 1.5 to 5.0 wt % with respect to the base resin.

Fraction (B) preferably is an ethylene homopolymer.

Fraction (B) preferably has a lower weight average molecular weight than fraction (A).

Consequently, the melt flow rate of the combined fractions (A) and (B) is higher than the melt flow rate of fraction (A).

Suitably, the combined fractions (A) and (B) have a melt flow rate MFR$_2$ (190°, 2.16 kg) of from 5.0 to 250 g/10 min, preferably of from 7.5 to 180 g/10 min, more preferably of from 10 to 100 g/10 min.

Fraction (B) is preferably present in an amount of 5 to 40 wt %, more preferably in an amount of 10 to 35 wt % and most preferably in an amount of 15 to 30 wt % with respect to the base resin.

Fraction (C) preferably is an ethylene homopolymer.

Fraction (C) preferably has a lower weight average molecular weight than fraction (A).

Consequently, the melt flow rate of the combined fractions (A), (B) and (C) is higher than the melt flow rate of fraction (A) and of the combined fractions (A) and (B).

Suitably, the combined fractions (A), (B) and (C) have a melt flow rate $MFR_2$ (190°, 2.16 kg) of from 80 to 250 g/10 min, preferably of from 100 to 200 g/10 min, more preferably of from 110 to 180 g/10 min.

Fraction (C) is preferably present in an amount of 10 to 50 wt %, more preferably in an amount of 15 to 47 wt % and most preferably in an amount of 20 to 45 wt % with respect to the base resin.

The combined fractions (A), (B) and (C) are present in an amount of 35 to 70 wt %, more preferably in an amount of 40 to 65 wt % and most preferably in an amount of 45 to 63 wt % with respect to the base resin.

It is preferred that fractions (A), (B) and (C) are ethylene homopolymers. In said embodiment fractions (A), (B) and (C) usually cannot be clearly distinguished in the resultant base resin so that the base resin including fractions (A), (B), (C) and (D) qualifies as a bimodal base resin.

In one embodiment of the invention one, two or all of fractions (A), (B) and (C) are a copolymer of ethylene and at least one alpha-olefin comonomer units with 4 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-butene.

Fraction (D) preferably is a copolymer of ethylene and at least one alpha-olefin comonomer units with 4 to 12 carbon atoms.

Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-hexene.

Fraction (D) may further comprise further comonomer units different from alpha olefin comonomers such as dienes, polar comononers or silicon containing comonomers. It is, however, preferred that the fraction (D) only contains alpha olefin monomers as comonomer units.

In one especially preferred embodiment fraction (D) is an ethylene/1-hexene copolymer. The content of units derived from at least one alpha olefin comonomer having from 4 to 12 carbon atoms in fraction (D) is preferably from 0.01 to 1.5 mol %, more preferably from 0.04 to 1.2 mol %, most preferably from 0.06 to 1.0 mol %.

Fraction (D) preferably has higher weight average molecular weight than all of fractions (A), (B) and (C).

Suitably, the combined fractions (A), (B), (C) and (D), preferably the base resin, have a melt flow rate $MFR_5$ (190°, 5 kg) of not more than 0.20 g/10 min, preferably not more than 0.15 g/10 min and more preferably not more than 0.10 g/10 min. In some embodiments the melt flow rate $MFR_5$ (190°, 5 kg) of the combined fractions (A), (B), (C) and (D), preferably of the base resin, is not detectable.

Suitably, the combined fractions (A), (B), (C) and (D), preferably the base resin, have a melt flow rate $MFR_{21}$ (190°, 21.6 kg) of from 1.0 to 7.5 g/10 min, preferably of from 2.0 to 6.0 g/10 min and more preferably of from 2.5 to 5.5 g/10 min.

Fraction (D) is preferably present in an amount of 30 to 65 wt %, more preferably in an amount of 35 to 60 wt % and most preferably in an amount of 37 to 55 wt % with respect to the base resin.

It is preferred that the base resin is multimodal. Mostly preferred the base resin is bimodal.

Polyethylene Composition

In addition to the base resin, the polyethylene composition may comprise and preferably comprises usual additives for utilization with polyolefins, such as stabilizers (e.g. antioxidant agents), metal scavengers and/or UV-stabilizers, antistatic agents and utilization agents (such as processing aid agents). Preferably, the amount of these additives is 10 wt % or below, more preferably 9 wt % or below, more preferably 7 wt % or below, of the polyethylene composition.

Further preferred, the amount of additives different from carbon black is 0 wt % to 1 wt %, more preferably 0.001 wt % to 0.8 wt %, based on the total amount of the polyethylene composition.

The polyethylene composition comprises carbon black in an amount of 1.0 to 10 wt %, preferably 1.5 to 9.0 wt %, more preferably 1.8 to 8.0 wt %, still more preferably 1.8 to 7.0 wt %, and most preferably 1.8 to 6.0 wt %, based on the total amount of the polyethylene composition.

Carbon black can be added to polyethylene composition as such (neat) or in form of so-called master batch (CBMB), in which carbon black, and optionally further additives as defined above, are contained in concentrated form in a carrier polymer.

The optional carrier polymer of carbon black masterbatch is not calculated to the amount of the polymer components present in the polyethylene composition. In other words, it is to be understood that carbon black and optional additive(s) may be added to the polyethylene composition in form of a masterbatch, i.e. together with a carrier polymer. In such case the carrier polymer is not considered as polymer component(s), but is calculated into the amount (wt %) of carbon black or, respectively, into the amount (wt %) of additive(s).

The amount of the optional carrier polymer of the carbon black master batch is 0 to 5 wt % based on the total amount of the polyethylene composition.

Most preferably the polyethylene composition consists of the base resin, carbon black and optional further additives other than carbon black.

The polyethylene composition is characterized by the following properties:

Comonomer Content

The polyethylene composition preferably has a total content of comonomer units other than ethylene, preferably of at least one alpha-olefin having from 4 to 12 carbon atoms, most preferably 1-hexene, of from 0.01 to 0.50 mol %, more preferably of from 0.02 to 0.40 mol % and most preferably of from 0.05 to 0.35 mol %, based on the total molar amount of monomer units in the polyethylene composition.

$MFR_5$

The polyethylene composition preferably has a melt flow rate $MFR_5$ (190° C., 5 kg) of not more than 0.20 g/10 min, more preferably of not more than 0.15 g/10 min and most preferably of not more than 0.10 g/10 min determined according to ISO 1133.

In some embodiments the melt flow rate $MFR_5$ (190°, 5 kg) of the polyethylene composition is not detectable.

MFR$_{21}$

The polyethylene composition according to the present invention has a melt flow rate MFR$_{20}$ (190° C., 21.6 kg) of 1.0 to 7.5 g/10 min, preferably of 2.0 to 6.0 g/10 min and most preferably of 2.5 to 5.5 g/10 min determined according to ISO 1133.

Weight Average Molecular Weight Mw

The polyethylene composition preferably has a weight average molecular weight, Mw, in the range of 300 to 600 kg/mol, more preferably 350 to 550 kg/mol, most preferably in the range of 380 to 500 kg/mol.

Number Average Molecular Weight Mn

The polyethylene composition preferably has a number average molecular weight, Mn, in the range of 3 to 20 kg/mol, more preferably 4 to 17 kg/mol, most preferably in the range of 6 to 15 kg/mol.

z Average Molecular Weight Mz

The polyethylene composition preferably has a z average molecular weight, Mz, in the range of 1200 to 3000 kg/mol, more preferably 1300 to 2800 kg/mol, most preferably in the range of 1500 to 2650 kg/mol.

Molecular Weight Distribution Mw/Mn

The polyethylene composition preferably has a molecular weight distribution, Mw/Mn, in the range of 25 to 65, more preferably in the range of 27 to 63 and most preferably in the range of 30 to 60.

Density

The polyethylene composition according to the present invention preferably has a density of more than 960.0 kg/m$^3$ and equal to or less than 990.0 kg/m$^3$, more preferably of equal to or more than 961.0 kg/m$^3$ and equal to or less than 980.0 kg/m$^3$, most preferably of equal to or more than 962.0 kg/m$^3$ and equal to or less than 975.0 kg/m$^3$, determined according to ISO 1183-1:2004.

The density of the composition is influenced by the density of the base resin and can further be adjusted by the amount of filler, usually carbon black, in the composition.

The density of the base resin is mainly influenced by the amount and type of comonomer. In addition to that, the nature of the polymer originating mainly from the catalyst used as well as the melt flow rate play a role. In addition to that, it should be stressed that the comonomer does not need to be a single comonomer. Mixtures of comonomers are also possible.

The composition is further characterized by specific rheological properties.

eta$_{0.05}$

The polyethylene composition according to the invention has a complex viscosity at 0.05 rad/s eta$_{0.05}$ of from 750 kPa·s to 1900 kPa·s, preferably of from 800 kPa·s to 1700 kPa·s, more preferably of from 850 kPa·s to 1600 kPa·s, and most preferably of from 900 kPa·s to 1500 kPa·s.

The viscosity eta$_{0.05}$ is measured at a low frequency and thus a low shear stress and is proportional to the molecular weight of the composition. It can thus be seen as a measure for the molecular weight of the polyethylene composition.

eta$_{300}$

The polyethylene composition preferably has a complex viscosity at 300 rad/s eta$_{300}$ of 750 Pa·s to 2000 Pa·s, more preferably 900 Pa·s to 1900 Pa·s, and most preferably 1000 Pa·s to 1800 Pa·s.

The viscosity eta$_{300}$ is measured at a high frequency and thus a high shear stress and is inversely proportional to the flowability of the composition. It can thus be seen as a measure for the processability of the polyethylene composition.

PI

The polyethylene composition preferably has a polydispersity index PI within the range of equal to or higher than 2.5 Pa$^{-1}$ and less than 7.5 Pa$^{-1}$, more preferably within the range of equal to or higher than 3.0 Pa$^{-1}$ and than 7.0 Pa$^{-1}$ and most preferably within the range of equal to or higher than 3.5 Pa$^{-1}$ and less than 6.5 Pa$^{-1}$.

The polydispersity index PI is a rheological measure for the broadness of the molecular weight distribution.

The rheological properties, such as PI, eta$_{0.05}$, eta$_{300}$ and eta$_{747}$ described above, have been determined on the polyethylene composition which differs from the base resin by comprising additional components such as carbon black. These properties, however, can also be determined on the base resin, which has been stabilized with a stabilizer package. The rheological properties determined on the base resin are preferably in the same ranges as when determined on the polyethylene composition.

White Spot Rating (WSR)

The polyethylene composition according to the present invention has a white spot rating of not more than 12.0, more preferably of not more than 10.0 and most preferably of not more than 8.0, determined according to ISO 18553/2002-03-01.

The lower limit of the white spot rating is usually not higher than 3.0, preferably not higher than 5.0.

The white spot rating test is a measure for the homogeneity of a polyethylene composition and based on ISO 18553/2002-03-01. When compounding polyethylene compositions e.g. for producing pipes, so-called "white spots" occur in the compounded material. These white spots usually have a size of below 10 to about 75 micrometer and consist of non-pigmented, high molecular weight polymer agglomerates/particles that have not been adequately dispersed in the composition. These inhomogeneities in polymer compositions may increase roughness of the surface of articles produced thereof.

It is known that homogeneity of a multimodal polymer composition can be improved by applying multiple compounding steps and/or particular compounding conditions to the resin coming from the reactor. These measures, however, have the disadvantage that they are associated with a significant increase in production costs for the composition.

Thus, the white spot rating of the composition according to the present invention is determined after a single compounding step in a twin screw extruder at an extruder temperature before die plate of not more than 300° C. and a specific energy input SEI of not more than 350 kWh/ton.

Tensile Modulus

The polyethylene composition preferably has a tensile modulus, determined according to ISO 527-2:1993 of equal to or more than 1200 MPa, more preferably of equal to or more than 1250 MPa, and most preferably of equal to or more than 1300 MPa. The upper limit of the tensile modulus is usually not higher than 2000 MPa, preferably not higher than 1800 MPa.

Tensile Strain at Break

The polyethylene composition preferably has a tensile strain at break determined according to ISO 527-1 of at least 350%, more preferably of at least 400%, even more preferably of at least 450%, and most preferably of at least 480%. The upper limit of the tensile strain at break is usually equal to or less than 800%, more preferably equal to or less than 700%.

Tensile Stress at Break

The polyethylene composition preferably has a tensile stress at break determined according to ISO 527-1 of at least 15 MPa, more preferably of at least 18 MPa, even more preferably of at least 20 MPa, and most preferably of at least 22 MPa. The upper limit of the tensile stress at break is usually equal to or less than 50 MPa, more preferably equal to or less than 40 MPa.

Tensile Strain at Yield

The polyethylene composition preferably has a tensile strain at yield determined according to ISO 527-1 of at least 4.0%, more preferably of at least 4.5%, even more preferably of at least 5.0%, and most preferably of at least 5.5%. The upper limit of the tensile strain at yield is usually equal to or less than 15%, more preferably equal to or less than 12%.

Tensile Stress at Yield

The polyethylene composition preferably has a tensile stress at break determined according to ISO 527-1 of at least 15 MPa, more preferably of at least 18 MPa, even more preferably of at least 20 MPa, and most preferably of at least 22 MPa. The upper limit of the tensile stress at break is usually equal to or less than 50 MPa, more preferably equal to or less than 40 MPa.

Strain Hardening Modulus

The polyethylene composition preferably has a strain hardening modulus of equal to or more than 50 MPa, more preferably of equal to or more than 55 MPa, and most preferably of equal to or more than 60 MPa. The upper limit of the tensile modulus is usually not higher than 200 MPa, preferably not higher than 150 MPa.

In a further aspect the present invention is concerned with a polyethylene composition obtainable by a multistage process, the multistage process comprising the following steps:

a) polymerizing ethylene in the presence of a solid Ziegler-Natta catalyst component in a first reactor for obtaining a first intermediate material, b) transferring the first intermediate material to a second reactor
  (i) feeding ethylene to the second reactor
  (ii) further polymerizing the first intermediate material for obtaining a second intermediate material, the second intermediate material having a melt flow rate $MFR_2$ (190° C., 2.16 kg) of 5 to 250 g/10 min; and c) transferring the second intermediate material to a third reactor
  (i) feeding ethylene to the third reactor
  (ii) further polymerizing the second intermediate material for obtaining a third intermediate material, the third intermediate material having a melt flow rate $MFR_2$ (190° C., 2.16 kg) of 80 to 250 g/10 min;

d) transferring the third intermediate material to a fourth reactor
  (i) feeding ethylene and comonomer selected from alpha-olefins having from 4 to 12 carbon atoms to the fourth reactor
  (ii) further polymerizing the third intermediate material in the presence of a silane type external donor for obtaining a base resin having density of from 952.0 kg/m$^3$ to 960.0 kg/m$^3$, determined according to ISO 1183, and e) extruding the base resin into a polyethylene composition having a melt flow rate $MFR_{21}$ (190° C., 21.16 kg), of from 1.0 to 7.5 g/10 min, determined according to ISO 1133, a complex viscosity at a frequency of 0.05 rad/s $eta_{0.05}$ of from 750 kPa·s to 1900 kPa·s, determined according to ISO 6721-1 and ISO 6721-10, and a white spot rating of not more than 12.0, determined according to ISO 18553.

The first intermediate material preferably comprises of fraction (A). More preferably, the first intermediate material essentially consists of fraction (A) optionally together with unreacted monomers, solid Ziegler-Natta catalyst and optional unreacted chain transfer agent such as hydrogen.

The second intermediate material preferably comprises fractions (A) and (B). More preferably, the second intermediate material essentially consists of fractions (A) and (B) optionally together with unreacted monomers, solid Ziegler-Natta catalyst and optional unreacted chain transfer agent such as hydrogen.

The second intermediate material preferably comprises fractions (A), (B) and (C). More preferably, the second intermediate material essentially consists of fractions (A), (B) and (C) optionally together with unreacted monomers, solid Ziegler-Natta catalyst and optional unreacted chain transfer agent such as hydrogen.

The base resin preferably comprises fractions (A), (B), (C) and (D). More preferably, the base resin essentially consists of fractions (A), (B), (C) and (D).

The base resin and the polyethylene composition obtainable by the above described multistage process are preferably further defined by the properties of the base resin and the polyethylene composition described above or in claims.

Most preferably the polyethylene composition consists of the base resin, carbon black and optional further additives other than carbon black.

Article

In yet a further aspect, the present invention is concerned with an article comprising the polyethylene composition as described above, obtainable by a multistage process as described above and the use of such a polyethylene composition for the production of an article.

The article is preferably a pipe or pipe fitting.

Such pipes are further characterized by the following properties.

Resistance to Internal Pressure

The pipe comprising the polyethylene composition according to the present invention preferably has a resistance to internal pressure in a pressure test on un-notched pipes (PT) determined according to ISO 1167-1:2006 at a hoop stress of 7.0 MPa and a temperature of 80° C. of at least 6 h, more preferably of at least 15 h and most preferably at least 25 h. The upper limit of the resistance to internal pressure is usually not higher than 200 h, preferably not higher than 150 h, still more preferably not higher than 100 h and even more preferably not higher than 75 h.

Furthermore, the pipe comprising the polyethylene composition according to the present invention preferably has a resistance to internal pressure in a pressure test on un-notched pipes (PT) determined according to ISO 1167-1:2006 at a hoop stress of 6.8 MPa and a temperature of 80° C. of at least 85 h, more preferably of at least 90 h and most preferably at least 100 h. The upper limit of the resistance to internal pressure is usually not higher than 1500 h, preferably not higher than 1000 h, still more preferably not higher than 750 h and even more preferably not higher than 500 h.

Still further, the pipe comprising the polyethylene composition according to the present invention preferably has a resistance to internal pressure in a pressure test on un-notched pipes (PT) determined according to ISO 1167-1:2006 at a hoop stress of 6.4 MPa and a temperature of 80° C. of at least 500 h, more preferably of at least 750 h and most preferably at least 1000 h. The upper limit of the resistance to internal pressure is usually not higher than 30000 h, preferably not higher than 25000 h, still more preferably not higher than 10000 h and even more preferably not higher than 5000 h.

Further, the pipe comprising the polyethylene composition according to the present invention preferably has a resistance to internal pressure in a pressure test on unnotched pipes (PT) determined according to ISO 1167-1: 2006 at a hoop stress of 6.2 MPa and a temperature of 80° C. of at least 2000 h, more preferably of at least 2500 h and most preferably at least 3000 h. The upper limit of the resistance to internal pressure is usually not higher than 100000 h, preferably not higher than 70000 h, still more preferably not higher than 50000 h and even more preferably not higher than 10000 h.

Process

The polyethylene composition is produced in a process, wherein the base resin is polymerized in a multistage process in at least four sequential reactor stages in any order in the presence of a solid Ziegler-Natta catalyst component.

Catalyst

In general, the solid Ziegler-Natta catalyst component comprises a compound of a transition metal (TM), which transition metal is selected from one of the groups 4 to 6 of the periodic table (IUPAC). Preferably, the compound of a transition metal (TM) is a titanium compound, most preferably a titanium halide, like $TiCl_4$.

Additionally, the catalyst comprises a compound of a metal (M) which metal is selected from one of the groups 1 to 3 of the periodic table (IUPAC). Preferably, the catalyst comprises a metal of group 2 of the periodic table (IUPAC), more preferably a magnesium compound.

In one embodiment, the solid Ziegler-Natta catalyst component thus comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, (a3) optionally an internal donor (ID) and (a4) optionally a compound of Group 13 metal, preferably an aluminum compound.

If an internal donor (ID) is present, the internal donor (ID) is selected from among others, esters of carboxylic acids or dicarboxylic acids, like phthalates, maleates, substituted maleates, benzoates, and succinates, ethers and di-ethers or oxygen or nitrogen containing silicon compounds, or mixtures thereof.

The solid Ziegler-Natta catalyst component is typically a supported catalyst, wherein the support material is a particulate support, typically inorganic oxide support, such as silica, alumina, titania, silica-alumina, silica-titania or a $MgCl_2$ based support onto which active catalyst components are loaded. Preferably, the support is silica or a $MgCl_2$ based support. Alternatively, the solid Ziegler-Natta catalyst component is prepared without using any external support material, but instead is formed by a method where all active catalyst compounds are contacted and/or reacted in liquid with each other, and after that the solid catalyst is formed. The solid catalyst particles are formed via emulsion-solidification or via precipitation method.

In addition to the solid catalyst component the Ziegler-Natta catalyst comprises a cocatalyst. The cocatalyst typically comprises an aluminium trialkyl or aluminium alkyl halide compound, wherein alkyl groups typically contain 1 to 20 C-atoms, e.g. 1 to 10 C-atoms. The aluminium alkyl compound is preferably trialkyl aluminium, such as trimethylaluminium, triethylaluminium, tri-isobutylaluminium or tri-n-octylaluminium or dialkylaluminium halide, alkyl aluminium dihalide or alkyl aluminium sesquihalide, such as diethylaluminium chloride, dimethylaluminium chloride, ethylaluminium dichloride or ethylaluminium sesquichloride. In one specific embodiment, the co-catalyst (Co) is triethylaluminium (TEAL).

Further, the catalyst may comprise an external electron donor. Suitable external electron donors (ED) are silane type external donors. Silane type external donors are typically organosilane compounds containing Si—OCOR, Si—OR, or Si—$NR_2$ bonds, where R is an alkyl, alkenyl, aryl, arylalkyl or cycloalkyl with 1-20 carbon atoms are known in the art.

It is especially preferred to use silanes selected from compounds of the general formula

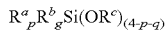

$$R^a_p R^b_q Si(OR^c)_{(4-p-q)}$$

wherein $R^a$, $R^b$ and $R^c$ denote a hydrocarbyl radical, in particular an alkyl or cycloalkyl group, and wherein p and q are numbers ranging from 0 to 3 with the sum p+q being equal to or less than 3. $R^a$, $R^b$ and $R^c$ can be chosen independently from one another and are linear, branched or cyclic hydrocarbyl groups having 1 to 12 carbon atoms, preferably $R^a$, $R^b$ and $R^c$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

An especially suitable external donor for polymerizing the base resin of the polyethylene composition of the present invention is dimethoxydimethylsilane.

Cocatalyst and the optional external electron donors are thus not part of the solid catalyst component, but fed as separate components into the off-line pre-polymerization and/or into any stage of the polymerization process.

Examples of suitable catalysts and compounds in catalysts are shown among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435, 550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

The solid Ziegler-Natta catalyst component is desirably in the form of particles having generally an average particle size range of 3 to 200 μm, preferably 5 to 100 μm.

Suitable solid Ziegler-Natta catalyst components preferably contain a titanium compound together with a magnesium halide compound acting as a support. Thus, the catalyst contains a titanium compound and optionally a Group 13 compound, for example an aluminium compound on a magnesium dihalide, like magnesium dichloride. Such catalysts are disclosed, for instance, in WO 2005/118655, EP 810235, WO2014/096296 and WO2016/097193.

One specific type of a solid Ziegler-Natta catalyst component for ethylene polymerization is a solid $MgCl_2$ supported catalyst component comprising an internal organic compound of formula (I) or isomers or mixtures therefrom

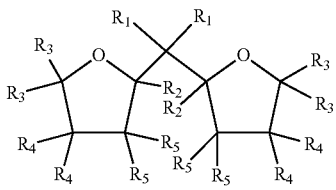 (I)

and
wherein in the formula (I)

$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated.

The solid Ziegler-Natta catalyst component can be pre-polymerized with one or more olefin monomer(s) selected from C2, C3 or C4 olefin monomers and mixtures thereof to obtain the pre-polymerized solid Ziegler-Natta catalyst.

Preferably, the off-line pre-polymerization of the solid Ziegler-Natta catalyst component is carried out with an olefin monomer selected from straight chain C3 or C4 olefin monomer. More preferably, the pre-polymerization of the solid Ziegler-Natta catalyst component is carried out with propylene.

It is further preferred that the off-line pre-polymerization of the solid Ziegler-Natta catalyst component is carried out in the presence of a co-catalyst and optionally in the presence of hydrogen. In addition, in some embodiments also an external electron donor may be present during off-line pre-polymerization, as defined above, typically selected from silanes.

The mol ratio of the external electron donor (ED) to the compound of a transition metal (TM) [ED:TM] during the off-line pre-polymerization step is from 0 to 5 mol/mol, and if present, preferably from 0.5 to 3 mol/mol.

It is appreciated that the catalyst pre-polymerization is carried out in the presence of a co-catalyst (Co) being a compound of group 13 metal, more preferably an Al compound, as defined above.

Additionally the mol ratio of the co-catalyst (Co) to the compound of a transition metal (TM) [Co/TM] during the off-line pre-polymerization step is in the range of 0.1 to 10 mol/mol, preferably in the range of 0.2 to 5 mol/mol.

The optional pre-polymerization of the solid Ziegler-Natta catalyst component is conducted off-line, in a medium. The medium is preferably an oil or a hydrocarbon solvent.

If the medium is an oil, the oil is preferably selected such that its density is sufficiently low and the viscosity of the optionally pre-polymerized solid Ziegler-Natta catalyst/medium mixture is sufficiently high to prevent the catalyst particles from segregation during transport and feeding into process step a). Such viscous substance can be an oil or a mixture of an oil with a solid or highly viscous substance (oil-grease). The viscosity of such a medium is usually 100 to 15000 cP at room temperature.

Alternatively, the medium is a hydrocarbon solvent. The hydrocarbon solvent to be employed in pre-polymerization may be selected among aromatic and aliphatic straight chain, branched and cyclic hydrocarbons with 5 to 20 carbon atoms, more preferably 5 to 12 carbon atoms, or mixtures thereof. Suitable hydrocarbon solvents include benzene, toluene, cumene, xylene, pentane, hexane, heptane, octane and nonane, preferably hexane and heptane, in particular n-heptane.

The optional pre-polymerization of the solid Ziegler-Natta catalyst component is most preferably carried out at a temperature ranging from 0° C. to 30° C.

In another embodiment the catalyst pre-polymerization degree is from 0.1 to 50 $g_{polymer}/g_{cat}$, preferably from 0.2 to 40 $g_{polymer}/g_{cat}$, even more preferably from 0.5 to 30 $g_{polymer}/g_{cat}$, still more preferably from 1 to 25 $g_{polymer}/g_{cat}$. pre-polymerization, especially 1, 2 to 25 $g_{polymer}/g_{cat}$.

The offline pre-polymerization of the solid Ziegler-Natta catalyst is used for narrowing the particle size distribution of the catalyst particles.

Other measures are known in the art to provide a solid Ziegler-Natta catalyst with a narrow particle size distribution, such as e.g. described in EP 1719788 A1. Such measures are equally suitable instead of the offline pre-polymerization as described above.

Process Details

Preferably, the multistage process for producing a polyethylene composition according to the present invention comprises the following steps:

(a) polymerizing ethylene in the presence of a solid Ziegler-Natta catalyst component in a first reactor for obtaining a first intermediate material, (b) transferring the first intermediate material to a second reactor
  (i) feeding ethylene to the second reactor
  (ii) further polymerizing the first intermediate material for obtaining a second intermediate material, the second intermediate material having a melt flow rate $MFR_2$ (190° C., 2.16 kg) of 5.0 to 250 g/10 min; and (c) transferring the second intermediate material to a third reactor
  (i) feeding ethylene to the third reactor
  (ii) further polymerizing the second intermediate material for obtaining a third intermediate material, the third intermediate material having a melt flow rate $MFR_2$ (190° C., 2.16 kg) of 80 to 250 g/10 min;

(d) transferring the third intermediate material to a fourth reactor
  (i) feeding ethylene and comonomer selected from alpha-olefins having from 4 to 12 carbon atoms to the fourth reactor
  (ii) further polymerizing the third intermediate material in the presence of a silane type external donor for obtaining a base resin having density of from 952.0 kg/m³ to 960.0 kg/m³, determined according to ISO 1183, and (e) extruding the base resin into a polyethylene composition.

In one embodiment of the present invention the solid Ziegler-Natta catalyst component is off-line pre-polymerized as described above or below before the first polymerization step (a). In another embodiment of the present invention the solid Ziegler-Natta catalyst component is not subjected to a off-line pre-polymerization step as described above or below before the first polymerization step (a).

The first intermediate material preferably comprises of fraction (A). More preferably, the first intermediate material essentially consists of fraction (A) optionally together with unreacted monomers, solid Ziegler-Natta catalyst and optional unreacted chain transfer agent such as hydrogen.

The second intermediate material preferably comprises fractions (A) and (B). More preferably, the second intermediate material essentially consists of fractions (A) and (B)

optionally together with unreacted monomers, solid Ziegler-Natta catalyst and optional unreacted chain transfer agent such as hydrogen.

The second intermediate material preferably comprises fractions (A), (B) and (C). More preferably, the second intermediate material essentially consists of fractions (A), (B) and (C) optionally together with unreacted monomers, solid Ziegler-Natta catalyst and optional unreacted chain transfer agent such has hydrogen.

The base resin preferably comprises fractions (A), (B), (C) and (D). More preferably, the base resin essentially consists of fractions (A), (B), (C) and (D).

The base resin and the polyethylene composition obtained by the above described multistage process are preferably further defined by the properties of the base resin and the polyethylene composition described above or in claims.

The temperature in the first reactor, preferably the first slurry phase reactor, more preferably the first loop reactor, is typically from 35 to 75° C., preferably from 40 to 70° C. and in particular from 45 to 60° C. The pressure is typically from 1 to 150 bar, preferably from 1 to 100 bar.

The temperature in the second reactor, preferably the second slurry phase reactor, more preferably the second loop reactor, is typically from 50 to 115° C., preferably from 60 to 110° C. and in particular from 70 to 100° C. The pressure is typically from 1 to 150 bar, preferably from 1 to 100 bar.

The temperature in the third reactor, preferably the third slurry phase reactor, more preferably the third loop reactor, is typically from 50 to 115° C., preferably from 60 to 110° C. and in particular from 70 to 100° C. The pressure is typically from 1 to 150 bar, preferably from 1 to 100 bar.

The first reaction stage in principle may be conducted in any reactor. Preferably, the first reactor is a slurry reactor. Since in the first reaction stage only a small amount of ethylene polymer is polymerized suitably a small scale slurry reactor, such as a slurry reactor used for pre-polymerization steps is used.

The second and third reaction stage in principle may be conducted in any reactor. Preferably, both the second and third reactor are slurry reactors.

The slurry phase polymerization may be conducted in any known reactor used for slurry phase polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry phase polymerization above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1310295. Continuous withdrawal is disclosed, amongst others, in EP-A-891990, EP-A-1415999, EP-A-1591460 and WO-A-2007/025640. The continuous withdrawal is advantageously combined with a suitable concentration method as disclosed in EP-A-1415999 and EP-A-1591460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

For adjusting the melt flow rate of the polyethylene fraction polymerized in the slurry phase reactor preferably hydrogen is introduced into the reactor.

Suitably, in the first reaction stage no hydrogen or only small amounts of hydrogen are introduced into the first slurry phase reactor. Due to the low hydrogen concentrations in the first slurry phase reactor an ethylene polymer fraction with a low melt flow rate is obtained in the first reaction stage.

The polyethylene fraction produced in the second slurry phase reactor is preferably an ethylene homopolymer fraction.

The residence time and the polymerization temperature in the first slurry phase reactor are adjusted as such as to polymerize an ethylene homopolymer fraction typically in an amount of 0.5 to 10 wt %, preferably 1.0 to 7.5 wt % and most preferably 1.5 to 5.0 wt % of the total base resin.

Before directing the polymer slurry to the second loop reactor it can be subjected to a purging step for substantially removing hydrocarbons from the polymer slurry. It is however, preferred that the first intermediate material is not subjected to a purging step.

The hydrogen feed in the second reaction stage is preferably adjusted to the ethylene feed in order to fulfil a hydrogen to ethylene ratio in the second slurry phase reactor of 100 to 750 mol/kmol, more preferably of 200 to 600 mol/kmol.

The polyethylene fraction produced in the second slurry phase reactor is preferably an ethylene homopolymer fraction.

The residence time and the polymerization temperature in the second slurry phase reactor are adjusted as such as to polymerize an ethylene homopolymer fraction typically in an amount of 5 to 40 wt %, preferably 10 to 35 wt % and most preferably 15 to 30 wt % of the total base resin.

Before directing the polymer slurry to the third slurry reactor it can be subjected to a purging step for substantially removing hydrocarbons from the polymer slurry. It is however, preferred that the second intermediate material is not subjected to a purging step.

The hydrogen feed in the third reaction stage is preferably adjusted to the ethylene feed in order to fulfil a hydrogen to ethylene ratio in the third slurry phase reactor of 100 to 750 mol/kmol, more preferably of 200 to 600 mol/kmol.

The polyethylene fraction produced in the second slurry phase reactor is preferably an ethylene homopolymer fraction.

The residence time and the polymerization temperature in the third slurry phase reactor are adjusted as such as to polymerize an ethylene homopolymer fraction or an ethylene copolymer fraction typically in an amount of 10 to 50 wt %, preferably 15 to 47 wt % and most preferably 20 to 45 wt % of the total base resin.

Preferably, no comonomer is introduced in any of the first, second or third slurry phase reactor.

In another embodiment an ethylene copolymer fraction can be polymerized in one, two or all of the first, second or third slurry phase reactors. If polymerizing a copolymer, comonomers preferably are selected from the group comprising 1-butene, 1-hexene, 4-methyl-1-pentene, 1-octene or their mixtures, especially preferred are 1-butene and 1-hexene, and mostly preferred 1-butene. In a preferred embodiment in the third slurry phase reactor an ethylene copolymer with 1-butene comonomers is polymerized so that 1-butene is fed to the accordant reaction stage.

Typically, the third intermediate material exiting the third slurry phase reactor comprises ethylene polymer which makes up to 35 to 70 wt %, preferably 40 to 65 wt % and most preferably 45 to 63 wt % of the total base resin.

Before directing the polymer slurry to the fourth reactor it can be subjected to a purging step for substantially removing hydrocarbons from the polymer slurry. The purging step is preferably conducted in a flash vessel operated at a pressure of 2 to 10 bar and a temperature of 50 to 100° C. After applying the purging step, the third intermediate material produced in the third slurry reactor preferably is transferred to a fourth reactor, preferably a gas phase reactor, more preferably a fluidized bed gas phase reactor.

In a fluidised bed gas-phase reactor an olefin is polymerized in the presence of a polymerization catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer(s), eventually chain growth controllers or chain transfer agents, such as hydrogen, and eventually inert gas. The inert gas can thereby be the same or different as the inert gas used in the slurry phase reactor. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e. g. U.S. Pat. No. 4,933,149 and EP-A-684871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600414 and EP-A-721798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher than the minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practice. An overview is given, amongst others, in Geldart: Gas Fluidisation Technology, J. Wiley & Sons, 1996. When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerization.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699213, and WO-A-94/25495. It is also possible to add condensing agents into the recycle gas stream, as disclosed in EP-A-696293. The condensing agents are non-polymerizable components, such as propane, n-pentane, isopentane, n-butane or isobutane, which are at least partially condensed in the cooler.

The polymeric product may be withdrawn from the gas phase reactor either continuously or intermittently. Combinations of these methods may also be used. Continuous withdrawal is disclosed, amongst others, in WO-A-00/29452. Intermittent withdrawal is disclosed, amongst others, in U.S. Pat. No. 4,621,952, EP-A-188125, EP-A-250169 and EP-A-579426.

The top part of the at least one gas phase reactor may include a so called disengagement zone. In such a zone the diameter of the reactor is increased to reduce the gas velocity and allow the particles that are carried from the bed with the fluidisation gas to settle back to the bed. The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed levels.

Also antistatic agent(s) may be introduced into the at least one gas phase reactor if needed. Suitable antistatic agents and methods to use them are disclosed, amongst others, in U.S. Pat. Nos. 5,026,795, 4,803,251, 4,532,311, 4,855,370 and EP-A-560035. They are usually polar compounds and include, amongst others, water, ketones, aldehydes alcohols. The reactor may include a mechanical agitator to further facilitate mixing within the fluidised bed. An example of suitable agitator design is given in EP-A-707513.

The temperature in the gas phase polymerization in the gas phase reactor typically is at least 70° C., preferably at least 80° C. The temperature typically is not more than 105° C., preferably not more than 95° C. The pressure is typically at least 10 bar, preferably at least 15 bar but typically not more than 30 bar, preferably not more than 25 bar.

For adjusting the melt flow rate of the polyethylene fraction polymerized in the first gas phase reactor hydrogen is introduced into the reactor.

The hydrogen feed is preferably adjusted to the ethylene feed in order to fulfil a hydrogen to ethylene ratio in the gas phase reactor of 0.01 to 10 mol/kmol, more preferably of 0.1 to 5.0 mol/kmol and most preferably 0.2 to 3.0 mol/kmol.

In the gas phase reactor preferably an ethylene copolymer fraction is produced. The fluidisation gas stream thus comprises comonomers preferably selected from the group consisting of alpha-olefin conomoners with 4 to 12 carbon atoms, more preferably 4 to 8 carbon atoms. Suitable alpha-olefin comonomer species are 1-butene, 1-hexene and 1-octene. 1-hexene are mostly preferred. The comonomer used in the first gas phase reactor may be the same or different to that used in the slurry phase reactor. The comonomer feed is preferably adjusted to the ethylene feed in order to fulfil a comonomer to ethylene ratio of at least 1.0 to 50 mol/kmol, more preferably 2.5 to 45 mol/kmol, most preferably 5.0 to 40 mol/kmol.

The residence time and the polymerization temperature in the gas phase reactor are adjusted as such as to polymerize an ethylene copolymer fraction typically in an amount of 30 to 65 wt %, preferably 35 to 60 wt % and most preferably 37 to 55 wt % of the total base resin.

Further, the final base resin emerging from the gas phase reactor, preferably consisting of fractions (A), (B), (C) and (D) preferably has a density of from 952.0 kg/m³ to 960.0 kg/m³. Preferably the density of the base resin is equal to or more than 953.0 kg/m³ and equal to or less than 959.0 kg/m³, more preferably of equal to or more than 954.0 kg/m³ and equal to or less than 958.0 kg/m³.

The solid Ziegler-Natta catalyst component can be fed to any polymerization stage but preferably is fed to the first polymerization stage. Most preferably the solid Ziegler-Natta catalyst component is only fed to the first polymerization stage. The catalyst may be transferred into the polymerization zone by any means known in the art. It is thus possible to suspend the catalyst in a diluent and maintain it as homogeneous slurry. Especially preferred is to use oil having a viscosity from 20 to 1500 mPa*s as diluent, as disclosed in WO-A-2006/063771. It is also possible to mix the catalyst with a viscous mixture of grease and oil and feed the resultant paste into the polymerization zone. Still further, it is possible to let the solid Ziegler-Natta catalyst component settle and introduce portions of thus obtained catalyst mud into the polymerization zone in a manner as disclosed, for instance, in EP-A-428054.

The external donor can be fed to any polymerization stage but preferably is fed to the fourth polymerization stage preferably conducted in the gas phase reactor. Most preferably the external donor is only fed to the fourth polymerization stage.

Compounding

The polyethylene composition of the invention preferably is produced in a multi-stage process which further comprises a compounding step, wherein the base resin, which is typically obtained as a base resin powder from the reactor, is extruded in an extruder and then pelletized to polymer pellets in a manner known in the art to form the polyolefin composition of the invention.

Optionally, additives or other polymer components can be added to the composition during the compounding step in an amount as described above. Preferably, the composition of the invention obtained from the reactor is compounded in the extruder together with additives in a manner known in the art.

The extruder may be e.g. any conventionally used extruder. As an example of an extruder for the present compounding step may be those supplied by Japan Steel works, Kobe Steel or Farrel-Pomini, e.g. JSW 460P or JSW CIM90P.

In one embodiment, the extrusion step is carried out using feed rates of 80 kg/h to 500 kg/h, more preferably 90 kg/h to 300 kg/h. Preferably, the throughput is typically from 10 to 50 tons/h in commercial production.

The screw speed of the extruder is preferably 250 rpm to 550 rpm, more preferably 300 rpm to 500 rpm.

Preferably, in said extrusion step the SEI (specific energy input) of the extruder may be 200 kWh/ton to 350 kWh/ton, more preferably 250 kWh/ton to 300 kWh/ton, whereby the SEI is directly calculated from the electric input of the extruder ignoring the intrinsically limited effectiveness.

The extruder temperature before die plate in said extrusion step is preferably 200° C. to 300° C., more preferably 230° C. to 250° C.

Preferably the temperatures at the zones of an extruder having 4 zones are set as follows: Zone 1 is preferably set to 80 to 120° C. Zone 2 is preferably set to 120 to 220° C. Zone 3 is preferably set to 230 to 310° C. Zone 4 is preferably set to 160 to 250° C.

More preferably the 4 zones are set as follows: Zone 1 from 90 to 110° C.; zone 2 from 130 to 220° C.; zone 3 from 240 to 300° C.; and zone 4 from 170 to 220° C.

Pipe Production

Polymeric pipes are generally manufactured by extrusion, or, to a small extent, by injection moulding. A conventional plant for extrusion of polymer pipes comprises an extruder, a die-head, a calibrating device, cooling equipment, a pulling device, and a device for cutting and/or for coiling up the pipe.

The manufacture of polyethylene materials for use in pressure pipes is discussed in an article by Scheirs et al (Scheirs, Böhm, Boot and Leevers: PE100 Resins for Pipe Applications, TRIP Vol. 4, No. 12 (1996) pp. 408-415). The authors discuss the production technology and properties of PE100 pipe materials. They point out the importance of proper comonomer distribution and molecular weight distribution in order to optimize slow crack growth and rapid crack propagation.

Use

The present invention further relates to the use of a polyethylene composition as defined above or below for the production of an article.

The article is preferably a pipe or pipe fitting as described above or below.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in kg/m³.

c) Comonomer Content

Quantitative nuclear-magnetic resonance (NMR) spectroscopy was used to quantify the comonomer content of the polymers.

Quantitative $^{13}C\{^{1}H\}$ NMR spectra recorded in the molten-state using a Bruker Avance III 500 NMR spectrometer operating at 500.13 and 125.76 MHz for $^{1}H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]} and the RSHEPT decoupling scheme {[4], [5]}. A total of 16384 transients were acquired per spectrum. This setup was chosen due to its high sensitivity towards low comonomer contents.

Quantitative $^{13}C\{^{1}H\}$ NMR spectra were processed, integrated and quantitative properties determined using custom spectral analysis automation programs. All chemical shifts are internally referenced to the bulk methylene signal (δ+) at 30.00 ppm {[7]}.

Characteristic signals resulting from isolated 1-hexene incorporation i.e. EEHEE comonomer sequences, were observed {[7]}. Isolated 1-hexene incorporation was quantified using the integral of the signal at 38.3 ppm assigned to the *B4 sites, accounting for the number of reporting sites per comonomer:

$$H = I*_{B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.8 and 32.2 ppm assigned to the 2s and 3s sites respectively:

$$S = (\tfrac{1}{2})*(I_{2S}+I_{3S})$$

The relative content of ethylene was quantified using the integral of the bulk methylene (δ+) signals at 30.0 ppm:

$$E = (\tfrac{1}{2})*I_{\delta+}$$

The total ethylene comonomer content was calculated based on the bulk methylene signals and accounting for ethylene units present in other observed comonomer sequences or end-groups:

$$E_{total} = E + (5/2)*B + (3/2)*S$$

The total mole fraction of 1-hexene in the polymer was then calculated as:

$$fH = (H_{total}/(E_{total}+H_{total})$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Reson. 2005, 176, 239.

[5] Griffin, J. M., Tripon, C., Samoson, A., Filip, C., and Brown, S. P., Mag. Res. in Chem. 2007, 45, S1, S198.

[6] Castignolles, P., Graf, R., Parkinson, M., Wilhelm, M., Gaborieau, M., Polymer 50 (2009) 2373.

[7] J. Randall, Macromol. Sci., Rev. Macromol. Chem. Phys. 1989, C29, 201.

d) Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time. Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta''$ and the loss tangent, tan $\eta$, which can be expressed as follows:

$$G' = \frac{\sigma_0}{\gamma_0}\cos\delta\,[\text{Pa}] \quad (3)$$

$$G'' = \frac{\sigma_0}{\gamma_0}\sin\delta\,[\text{Pa}] \quad (4)$$

$$G^* = G' + iG''\,[\text{Pa}] \quad (5)$$

$$\eta^* = \eta' - i\eta''\,[\text{Pa·s}] \quad (6)$$

$$\eta' = \frac{G''}{\omega}\,[\text{Pa·s}] \quad (7)$$

$$\eta'' = \frac{G'}{\omega}\,[\text{Pa·s}] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x \text{ kPa})}{Eta^* \text{ for } (G^* = y \text{ kPa})} \quad (9)$$

For example, the $SHI_{(2.7/210)}$ is defined by the value of the complex viscosity, in Pa s, determined for a value of G* equal to 2.7 kPa, divided by the value of the complex viscosity, in Pa s, determined for a value of G* equal to 210 kPa.

The values of storage modulus (G'), loss modulus (G"), complex modulus (G*) and complex viscosity ($\eta^*$) were obtained as a function of frequency ($\omega$).

Thereby, e.g. $\eta^*_{300rad/s}$ ($eta^*_{300rad/s}$) is used as abbreviation for the complex viscosity at the frequency of 300 rad/s and $\eta^*_{0.05rad/s}$ ($eta^*_{0.05rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s. The elasticity balance $\tan_{0.05}/\tan_{300}$ is defined as the ratio of the loss tangent $\tan_{0.05}$ and the loss tangent $\tan_{300}$.

Besides the above mentioned rheological functions one can also determine other rheological parameters such as the so-called elasticity index EI(x). The elasticity index Ei(x) is the value of the storage modulus, G' determined for a value of the loss modulus, G" of x kPa and can be described by equation 10.

$$EI(x) = G' \text{ for } (G'' = x \text{ kPa})[\text{Pa}] \quad (10)$$

For example, the EI(5 kPa) is the defined by the value of the storage modulus G', determined for a value of G" equal to 5 kPa.

The viscosity $eta_{747}$ is measured at a very low, constant shear stress of 747 Pa and is inversely proportional to the gravity flow of the polyethylene composition, i.e. the higher $eta_{747}$ the lower the sagging of the polyethylene composition.

The polydispersity index, PI, is defined by equation 11.

$$PI = \frac{10^5}{G'(\omega_{COP})}, \omega_{COP} = \omega \text{ for } (G' = G'') \quad (11)$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.

[2] "The influence of molecular structure on some rheological properties of polyethylene", Heino, E. L., Borealis Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

e) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or Polymer-Char GPC-IR control software.

The column set was calibrated using universal calibration (according to ISO 16014-2:2003) with 19 narrow MWD polystyrene (PS) standards in the range of 0.5 kg/mol to 11500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ A third order polynomial fit was used to fit the calibration data.

All samples were prepared in the concentration range of around 0.1 mg/ml and dissolved at 160° C. for 6 hours for PE in fresh distilled TCB stabilized with 1000 ppm Irgafos168 under continuous gentle shaking.

f) Tensile Modulus and Tensile Properties

As a measure for stiffness, the tensile modulus (E-modulus) of the compositions was measured at 23° C. on compression molded specimens according to ISO 527-2:1993. The specimens (1A type) were cut from plaques of 4 mm thickness prepared by compression molding according to ISO 293:2004 using the conditions defined in chapter 3.3 of ISO 1872-2:2007. The modulus was measured at a speed of 1 mm/min.

The tensile strain at break (in %) was determined on the same samples according to ISO 527-1. The measurement was conducted at 23° C. with an elongation rate (cross head speed) of 50 mm/min.

g) Measure of Homogeneity/White Spot Rating (WSR)

The white spot rating of the compounded composition is determined according to ISO 18 553/2002-03-01 as follows:

Pellets of the composition which are obtained after a single compounding step are analysed by collecting 6 different pellets where from each pellet, one cut is used (thickness of about 10 μm).

The single compounding step is conducted using a twin screw extruder at an extruder temperature before die plate of not more than 300° C. and a specific energy input SEI of not more than 350 kWh/ton. In the example section the compounding conditions for the single compounding step are listed in Table 2.

The cut for the measurement of the white spot rating should be taken near the middle of the pellet (sample) with rotation microtome Type Leica RM2265. Preferably, the cut is in flow direction of the melt through the whole of the pelletizer.

The cuts are evaluated at a magnification of 100× and the size and the number of the non-coloured inclusions ("white-spots"=non-pigmented, high molecular weight agglomerates/particles in the polymer) on the total area of each cut are determined. All white spots with a diameter of >5 μm are counted. Transmission light microscope Olympus BX41 with XYZ motorised stage from Märzhäuser and particle inspector Software from Olympus was used.

The white spot rating test "homogeneity" is based on the ISO 18553/2002-03-01. In this test, inhomogeneities of the composition, present after a single compounding step as described above, which appear as white spots, are determined and rated according to the rating scheme given in ISO 18553/2002-03-01. The lower the composition is rated (less amount of high molecular weight particles) in this test, the better is the homogeneity of the composition. The rating scheme given in ISO 18553/2002-03-01 ends at a white spot rating value of 7.0. For higher ratings an internal extrapolation of said rating scheme was used as listed in the table below:

| Note | Extrapolation of rating scheme given in ISO18553/2002 Mar. 1 | | | | | | | | | | | |
| --- | --- | --- | --- | --- | --- | --- | --- | --- | --- | --- | --- | --- |
| | 101-110 | 111-120 | 121-130 | 131-140 | 141-150 | 151-160 | 161-170 | 171-180 | 181-190 | 191-200 | 201-210 | 211-220 |
| 7.0 | 12 | 6 | 3 | 1 | | | | | | | | |
| 7.5 | | 12 | 6 | 3 | 1 | | | | | | | |
| 8.0 | | | 12 | 6 | 3 | 1 | | | | | | |
| 8.5 | | | | 12 | 6 | 3 | 1 | | | | | |
| 9.0 | | | | | 12 | 6 | 3 | 1 | | | | |
| 9.5 | | | | | | 12 | 6 | 3 | 1 | | | |
| 10.0 | | | | | | | 12 | 6 | 3 | 1 | | |
| 10.5 | | | | | | | | 12 | 6 | 3 | 1 | |
| 11.0 | | | | | | | | | 12 | 6 | 3 | 1 |
| 11.5 | | | | | | | | | | 12 | 6 | 3 |
| 12.0 | | | | | | | | | | | 12 | 6 |
| 12.5 | | | | | | | | | | | | 12 |
| 13.0 | | | | | | | | | | | | |
| 13.5 | | | | | | | | | | | | |
| 14.0 | | | | | | | | | | | | |
| 14.5 | | | | | | | | | | | | |
| 15.0 | | | | | | | | | | | | |
| 15.5 | | | | | | | | | | | | |
| 16.0 | | | | | | | | | | | | |

-continued

Extrapolation of rating scheme given in ISO18553/2002 Mar. 1

| | | | | | | | | | | | | |
|---|---|---|---|---|---|---|---|---|---|---|---|---|
| 16.5 | | | | | | | | | | | | |
| 17.0 | | | | | | | | | | | | |

| Note | 221-230 | 231-240 | 241-250 | 251-260 | 261-270 | 271-280 | 281-290 | 291-300 | 301-310 | 311-320 | 321-330 | 331-340 |
|---|---|---|---|---|---|---|---|---|---|---|---|---|
| 7.0 | | | | | | | | | | | | |
| 7.5 | | | | | | | | | | | | |
| 8.0 | | | | | | | | | | | | |
| 8.5 | | | | | | | | | | | | |
| 9.0 | | | | | | | | | | | | |
| 9.5 | | | | | | | | | | | | |
| 10.0 | | | | | | | | | | | | |
| 10.5 | | | | | | | | | | | | |
| 11.0 | | | | | | | | | | | | |
| 11.5 | 1 | | | | | | | | | | | |
| 12.0 | 3 | 1 | | | | | | | | | | |
| 12.5 | 6 | 3 | 1 | | | | | | | | | |
| 13.0 | 12 | 6 | 3 | 1 | | | | | | | | |
| 13.5 | | 12 | 6 | 3 | 1 | | | | | | | |
| 14.0 | | | 12 | 6 | 3 | 1 | | | | | | |
| 14.5 | | | | 12 | 6 | 3 | 1 | | | | | |
| 15.0 | | | | | 12 | 6 | 3 | 1 | | | | |
| 15.5 | | | | | | 12 | 6 | 3 | 1 | | | |
| 16.0 | | | | | | | 12 | 6 | 3 | 1 | | |
| 16.5 | | | | | | | | 12 | 6 | 3 | 1 | |
| 17.0 | | | | | | | | | 12 | 6 | 3 | 1 |

This table is cut at white spot ratings of 17.0 as obtained in the example section but can further be extrapolated accordingly for higher white spot ratings.

h) Strain Hardening Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 μm thick specimens according to ISO 18488.

i) Pressure Test on Un-Notched Pipes (PT); Resistance to Internal Pressure

The resistance to internal pressure has been determined in a pressure test on pressure test on un-notched 32 mm SDR 11 pipes having a length of 450 mm is carried out in water-inside and water-outside environment according to ISO 1167-1:2006. End caps of type A were used. The time to failure is determined in hours. Hoop stresses of 6.2 MPa, 6.4 MPa, 6.8 MPa and 7.0 MPa, each tested at a temperature of 80° C. were applied.

j) Particle Size Distribution [Mass Percent] and Particle Sizes

Particle size distribution [mass percent] and particle sizes were determined by laser diffraction measurements by Coulter LS 200.

Particle size distribution (PSD) defined by SPAN:

$$\text{Span} = \frac{D90 - D10}{D50}$$

The particle size and particle size distribution is a measure for the size of the particles. The D-values ($D_5$ (or $d_5$)), ($D_{10}$ (or $d_{10}$), $D_{50}$ (or $d_{50}$), $D_{90}$ (or $d_{90}$)) and $D_{95}$ (or $d_{95}$)) represent the intercepts for 5%, 10%, 50%, 90% and 95% of the cumulative mass of sample. The D-values can be thought of as the diameter of the sphere which divides the sample's mass into a specified percentage when the particles are arranged on an ascending mass basis. For example the $D_5$ is the diameter at which 5% of the sample's mass is comprised of particles with a diameter less than this value. The $D_{10}$ is the diameter at which 10% of the sample's mass is comprised of particles with a diameter less than this value. The $D_{50}$ is the diameter of the particle where 50% of a sample's mass is smaller than and 50% of a sample's mass is larger than this value. The $D_{90}$ is the diameter at which 90% of the sample's mass is comprised of particles with a diameter less than this value. The $D_{95}$ is the diameter at which 95% of the sample's mass is comprised of particles with a diameter less than this value. The $D_{50}$ value is also called median particle size. From laser diffraction measurements according to ASTM 13320-1 the volumetric D-values are obtained, based on the volume distribution.

The distribution width or span of the particle size distribution is calculated from the D-values $D_{10}$, $D_{50}$ and $D_{90}$ according to the below formula:

$$\text{Span} = \frac{D90 - D10}{D50}$$

The mean particle size is a calculated value similar to the concept of average. From laser diffraction measurements according to ASTM 13320-1 the volume based mean particle size is obtained and calculated as follows:

$$\overline{D}_{pq}^{(p-q)} = \frac{\sum D_i^p}{\sum D_i^q}$$

wherein $\overline{D}$=the average or mean particle size
(p−q)=the algebraic power of $\overline{D}_{pq}$, whereby p>q
$D_i$=the diameter of the ith particle
$\Sigma$=the summation of $D_{ip}$ or $D_{iq}$ representing all particles in the sample Only in symmetric particle size distributions the mean particle size and the median particle size $D_{50}$ have the same value.

2. Materials a) Preparation of the Solid Ziegler-Natta Catalyst Component

The solid Ziegler-Natta catalyst component 1 (ZN1) used for inventive example IE1 based on $MgCl_2*3EtOH$ carrier was prepared according to WO 2017/207493. The solid Ziegler-Natta catalyst component 2 (ZN2) used for inventive examples IE2-5 based on $MgCl_2*3EtOH$ carrier was analogously prepared according to WO 2017/207493 with the exception that the resultant catalyst particle size was as follows: $d_{10}=2.7$ μm, $d_{50}=9.5$ μm, $d_{90}=24.3$ μm. The catalyst particle size can be obtained e.g. by sieving the carrier or catalyst in a suitable manner.

Consequently, for the inventive examples a solid Ziegler-Natta catalyst component was used based on $MgCl_2*3EtOH$ carrier was prepared according to WO 2017/207493 having a particle size distribution in the range of $d_{10}=3-12$ μm, $d_{50}=8-18$ μm and $d_{90}=13-32$ μm.

The solid Ziegler-Natta catalyst component 3 (ZN3) used for comparative examples CE1-2 based on $MgCl_2*3EtOH$ carrier was prepared according to Reference Example 2 of WO 2016/124676.

b) Offline Pre-Polymerization of the Solid Ziegler-Natta Catalyst Components ZN1 and ZN2

Diluted Ziegler-Natta catalyst oil slurry (37.37 kg containing 4.9 wt.-% of solid Ziegler-Natta catalyst components ZN1 and ZN2 as described above was added to the reactor at 20° C. followed by 33 wt.-% solution of TEAL in heptane (0.87 kg; Al/Ti=1.0 mol/mol). Off-line pre-polymerization was initiated almost immediately after TEAL addition (stirring time ~5 min) by continuous addition of propylene at 20-25° C. A target pre-polymerization degree was set equal to 2 g polymer/$g_{cat}$ and the desired degree of pre-polymerization was reached after 5 h 10 min. The pressure was released and the reactor was flushed five times with nitrogen and then dried under vacuum for 1 h. Dried off-line pre-polymerized Ziegler-Natta catalyst in oil was taken out into a catalyst drum. The yield was 42.97 kg containing 13.9 wt.-% of off-line pre-polymerized Ziegler-Natta catalyst with pre-polymerization degree of 2 polymer $g/g_{cat}$. The off-line pre-polymerized Ziegler-Natta catalyst had a particle size distribution in the range of $d_{10}=5-18$ μm, $d_{50}=12-35$ μm and $d_{90}=26-50$ μm.

c) Multi-Stage Polymerization for Inventive Example IE1

A loop reactor having a volume of 50 $dm^3$ was operated at 50° C. and 58 bar pressure. For producing a first polymer fraction 4 kg/h of ethylene and 2 g/h of hydrogen were introduced into the reactor having a volume of 50 $dm^3$. In addition, the pre-polymerized solid Ziegler-Natta catalyst component ZN1 prepared according to the description above was introduced into the reactor at a rate of 5.1 g/h. No additional comonomer was introduced into the reactor. The conditions in the reactor as shown in Table 1.

The polymer slurry was withdrawn from the loop reactor and transferred into a loop reactor having a volume of 150 $dm^3$. This second loop reactor was operated at 95° C. and 56 bar pressure. Into the reactor were introduced ethylene and hydrogen so that the ratio of hydrogen to ethylene (H2/C2) in the reactor was 492 mol/kmol. No additional catalyst feed or comonomer feed was introduced into the reactor. The conditions in the reactor as shown in Table 1.

The polymer slurry was withdrawn from the second loop reactor and transferred into a further loop reactor having a volume of 350 $dm^3$. This third loop reactor was operated at 95° C. and 54 bar pressure. Into the reactor were introduced ethylene and hydrogen so that the ratio of hydrogen to ethylene (H2/C2) in the reactor was 396 mol/kmol. No additional catalyst feed was introduced into the reactor. The conditions in the reactor as shown in Table 1.

The polymer slurry was withdrawn from the third loop reactor and transferred into a flash vessel operated at 3 bar pressure and 40-60° C. temperature where the hydrocarbons were substantially removed from the polymer. The polymer was then introduced into a gas phase reactor operated at a temperature of 85° C. and a pressure of 20 bar. In addition ethylene, 1-hexene was introduced into the reactor so that the ratio of hydrogen to ethylene (H2/C2) in the reactor was 0.4 mol/kmol and the ratio of 1-hexene to ethylene (C6/C2) in the reactor was 18.8 mol/kmol. Additionally dimethoxydimethylsilane was introduced into the reactor as external donor at a feed rate of 2.5 g/h. The conditions are shown in Table 1.

The resulting polymer was purged with nitrogen (about 50 kg/h) for one hour, stabilised with 2200 ppm of Irganox B225 and 1500 ppm Ca-stearate and then extruded together with 5.75 wt % carbon black masterbatch that leads to 2.3 wt % carbon black in the final polymer composition to pellets in a counter-rotating twin screw extruder CIM90P (manufactured by Japan Steel Works) so that the throughput was 148 kg/h and the screw speed was 449 rpm.

e) Multi-Stage Polymerization for Inventive Examples IE2-5

Inventive examples IE2-5 were polymerized using the same reactor configuration as described for the inventive examples. As catalyst the offline pre-polymerized solid Ziegler-Natta catalyst component ZN2 as described above was used. The polymerization conditions and feeds to the different reactors are shown in Table 1.

j) Multi-Stage Polymerization for Comparative Examples CE1 and CE2 Comparative examples CE11 and CE2 were polymerized using the same reactor configuration as described for the inventive examples. As catalyst the solid Ziegler-Natta catalyst component ZN3 as described above was used without previous offline pre-polymerization step. Into the first loop reactor additionally 1-butene was introduced. Unreacted 1-butene was transferred to the following polymerization stages until it was removed in the flash vessel. The polymerization conditions and feeds to the different reactors are shown in Table 1.

TABLE 1

Polymerization conditions

|  | IE1 | IE2 | IE3 | IE4 | IE5 | CE1 | CE2 |
|---|---|---|---|---|---|---|---|
| First loop reactor: | | | | | | | |
| Temperature [° C.] | 50 | 50 | 50 | 50 | 50 | 70 | 70 |
| Pressure [bar] | 57 | 56 | 55 | 56 | 57 | 59 | 59 |
| Catalyst feed [g/h] | 5.1 | 6.0 | 6.0 | 6.9 | 6.9 | 11.0 | 10.9 |

TABLE 1-continued

| Polymerization conditions | | | | | | | |
|---|---|---|---|---|---|---|---|
| | IE1 | IE2 | IE3 | IE4 | IE5 | CE1 | CE2 |
| $C_2$ feed [kg/h] | 4 | 4 | 4 | 4 | 4 | 2 | 2 |
| $C_4$ feed [g/h] | 0 | 0 | 0 | 0 | 0 | 60.3 | 59.7 |
| $H_2$ feed [g/h] | 2 | 2 | 5 | 5 | 5 | 2 | 2 |
| Split [wt %] | 2.5 | 2.6 | 2.55 | 2.7 | 2.6 | 2.4 | 2.5 |
| Second loop reactor | | | | | | | |
| Temperature [° C.] | 95 | 95 | 95 | 95 | 95 | 95 | 95 |
| Pressure [bar] | 56 | 54 | 52 | 54 | 55 | 56 | 56 |
| $H_2/C_2$ [mol/kmol] | 492 | 517 | 567 | 468 | 489 | 632 | 601 |
| $C_4/C_2$ [mol/kmol] | 0 | 0 | 0 | 0 | 0 | 5.0 | 5.2 |
| $C_2$ concentration [mol %] | 2.7 | 1.2 | 1.2 | 1.1 | 1.1 | 4.3 | 4.0 |
| Split [wt %] | 17.7 | 17.6 | 17.4 | 18.8 | 18.55 | 21.2 | 21.1 |
| $MFR_2$ [g/10 min] | 36 | 13 | 25 | 31 | 37 | 89 | 112 |
| Third loop reactor | | | | | | | |
| Temperature [° C.] | 95 | 95 | 95 | 95 | 95 | 95 | 95 |
| Pressure [bar] | 54 | 52 | 50 | 53 | 53 | 51 | 51 |
| $H_2/C_2$ [mol/kmol] | 396 | 410 | 403 | 438 | 443 | 461 | 427 |
| $C_4/C_2$ [mol/kmol] | 0 | 2.3 | 2.9 | 2.2 | 1.4 | 0 | 0 |
| $C_2$ concentration [mol %] | 3.9 | 2.7 | 3.1 | 2.8 | 2.6 | 4.7 | 4.8 |
| Split [wt %] | 41.1 | 40.3 | 39.55 | 39.0 | 38.65 | 34.9 | 36.3 |
| $MFR_2$ [g/10 min] | 144 | 125 | 118 | 147 | 145 | 170 | 188 |
| Gas phase reactor: | | | | | | | |
| Temperature [° C.] | 85 | 85 | 85 | 85 | 85 | 85 | 85 |
| Pressure [bar] | 20 | 20 | 20 | 20 | 20 | 20 | 20 |
| $H_2/C_2$ [mol/kmol] | 0.4 | 0.3 | 0.6 | 0.8 | 0.9 | 2.3 | 2.2 |
| $C_6/C_2$ [mol/kmol] | 18.8 | 15.6 | 17.7 | 6.3 | 6.0 | 7.3 | 7.0 |
| $C_2$ concentration [mol %] | 24.8 | 30.1 | 20.1 | 20.7 | 19.2 | 12.5 | 13.0 |
| external donor feed [g/h] | 2.5 | 2.5 | 25 | 2.5 | 2.5 | 3.6 | 3.6 |
| Split [wt %] | 38.7 | 39.5 | 40.5 | 39.5 | 40.2 | 41.5 | 40.1 |
| $MFR_5$ [g/10 min] | 0.08 | 0.04 | n.d. | 0.04 | 0.03 | 0.05 | 0.07 |
| $MFR_{21}$ [g/10 min] | 5.2 | 3.3 | 3.8 | 3.8 | 3.5 | 3.6 | 4.5 |
| Density [kg/m³] | 954.7 | 955.5 | 953.4 | 956.4 | 956.4 | 952.5 | 954.1 |
| D5 [μm] | 119 | | | | | 39 | 36 |
| D10 [μm] | 156 | | | | | 67 | 68 |
| D50 [μm] | 321 | | | | | 320 | 302 |
| D90 [μm] | 666 | | | | | 673 | 613 |
| D95 [μm] | 799 | | | | | 798 | 724 |
| Span | 1.6 | | | | | 1.9 | 1.8 |
| D95/D5 | 6.7 | | | | | 20.5 | 19.9 |

The resulted particle size distribution curves of examples IE1, CE11 and CE2 are illustrated in FIG. 1 and the D5, D10, D50, D90 and D95 values of the corresponding particle size distributions are reported in Table 1. As it can be seen, the final polymer particles produced by the off-line pre-polymerized Ziegler-Natta catalyst (IE1, reported in Table 1) exhibit a narrower particle size distribution (Span=1.6 and D95/D5=6.7) compared to those ones produced by the Ziegler-Natta catalyst without any off-line pre-polymerization step (Span=1.9 and Span=1.8) (CEL and CE2).

g) Preparation of Polyethylene Compositions of Examples IE1 and CE1-CE2

The resulting polymer was purged with nitrogen (about 50 kg/h) for one hour, stabilised with 2200 ppm of Irganox B225 and 1500 ppm Ca-stearate and then extruded together with 2.3 wt % carbon black to pellets in a counter-rotating twin screw extruder CIM90P (manufactured by Japan Steel Works). The compounding conditions are listed in Table 2.

TABLE 2

| Compounding conditions | | | | | | | |
|---|---|---|---|---|---|---|---|
| | IE1 | IE2 | IE3 | IE4 | IE5 | CE1 | CE2 |
| Feed [kg/h] | 148 | 128 | 148 | 148 | 148 | 223 | 227 |
| Screw speed [rpm] | 449 | 400 | 449 | 471 | 470 | 323 | 330 |

TABLE 2-continued

| Compounding conditions | | | | | | | |
|---|---|---|---|---|---|---|---|
| | IE1 | IE2 | IE3 | IE4 | IE5 | CE1 | CE2 |
| SEI [kWh/ton] | 278 | 299 | 276 | 277 | 165 | 218 | 219 |
| Melt temperature [° C.] | 239 | 246 | 237 | 243 | 240 | 269 | 266 |
| Zone 1 temperature [° C.] | 100 | 101 | 98 | 98 | 96 | 100 | 100 |
| Zone 2 temperature [° C.] | 153 | 157 | 155 | 158 | 151 | 186 | 184 |
| Zone 3 temperature [° C.] | 268 | 299 | 231 | 249 | 212 | 259 | 259 |
| Zone 4 temperature [° C.] | 204 | 214 | 191 | 195 | 192 | 250 | 250 |

The properties of the compounded compositions are shown in Table 3.

TABLE 3

| Properties of the polyethylene compositions | | | | | | | |
|---|---|---|---|---|---|---|---|
| | IE1 | IE2 | IE3 | IE4 | IE5 | CE1 | CE2 |
| $C_6$-content [mol %] | 0.14 | 0.08 | 0.11 | <0.05 | <1.05 | 0.08 | 0.08 |
| $MFR_5$ [g/10 min] | 0.03 | 0.02 | 0.02 | n.d. | 0.02 | 0.04 | 0.05 |
| $MFR_{21}$ [g/10 min] | 4.1 | 2.6 | 2.4 | 3.5 | 2.7 | 2.9 | 2.8 |
| Density [kg/m³] | 968 | 967 | 967 | 969 | 968 | 967 | 968 |
| PI [Pa$^{-1}$] | 5.2 | 5.3 | | | | 2.8 | 3.1 |
| $eta_{0.05}$ [kPa · s] | 935 | 1021 | 1285 | 1288 | 1259 | 1185 | 1424 |
| $eta_{300}$ [Pa · s] | 1321 | 1416 | 1476 | 1348 | 1297 | 1753 | 1710 |
| Mn [kg/mol] | 7.9 | 12.0 | 13.2 | 12.6 | 11.5 | 9.3 | 8.6 |

TABLE 3-continued

Properties of the polyethylene compositions

| | IE1 | IE2 | IE3 | IE4 | IE5 | CE1 | CE2 |
|---|---|---|---|---|---|---|---|
| Mw [kg/mol] | 437 | 418 | 443 | 458 | 465 | 443 | 497 |
| Mz [kg/mol] | 2123 | 2010 | 2130 | 2170 | 2210 | 2143 | 2410 |
| Mw/Mn | 55.6 | 34.9 | 33.6 | 36.3 | 40.5 | 47.6 | 57.8 |
| Tensile modulus [MPa] | 1318 | 1374 | 1305 | 1405 | 1397 | 1276 | 1313 |
| Strain at break [%] | 556 | 528 | 500 | 601 | 593 | 589 | 573 |
| Stress at break [MPa] | 27.2 | 24.2 | 24.6 | 32.8 | 32.8 | 30.6 | 29.3 |
| Yield strain [%] | 8.5 | 7.9 | 8.1 | 7.7 | 7.7 | 8.9 | 8.5 |
| Yield stress [MPa] | 27.8 | 28.9 | 28.1 | 29.4 | 29.3 | 27.8 | 28.1 |
| SH modulus [MPa] | 80.9 | 69.1 | 103.2 | 82.9 | 84.8 | 70.3 | 67.7 |
| WSR | 8.3 | 9.9 | 11.8 | 10.3 | 10.8 | 17.0 | 17.0 | n.d = not determinable h) Preparation of Pipes from the Polyethylene Compositions of Examples IE1-IE5 and CE1-CE2

The polyethylene compositions of examples IE1 and CE11-CE2 were extruded to 32 mm SDR 11 pipes in with a Krauss Maffei KME 45-36D pipe extruder (universal 45 mm diameter barrier screw 36 D long). Extrusion conditions are presented in Table 4.

TABLE 4

Extrusion conditions of the pipe preparation

| | | CE1 | CE2 | IE1 | IE2 | IE3 | IE4 | IE5 |
|---|---|---|---|---|---|---|---|---|
| adaptor | °C. | 200 | 200 | 200 | 200 | 200 | 200 | 200 |
| barrel zone 1 | °C. | 220 | 220 | 220 | 217 | 220 | 213 | 216 |
| barrel zone 2 | °C. | 215 | 215 | 215 | 215 | 215 | 215 | 215 |
| barrel zone 3 | °C. | 210 | 210 | 210 | 210 | 210 | 210 | 210 |
| barrel zone 4 | °C. | 210 | 210 | 210 | 210 | 210 | 210 | 210 |
| barrel zone 5 | °C. | 200 | 200 | 200 | 200 | 200 | 200 | 200 |
| Melt pressure | bar | 248 | 236 | 226 | 227 | 236 | 220 | 219 |
| Melt temperature | °C. | 207 | 209 | 213 | 211 | 207 | 209 | 206 |
| SEI | kWh/t | 148 | 146 | 160 | 150 | 160 | 143 | 148 |
| output | kg/hr | 50 | 50 | 50 | 50 | 50 | 50 | 50 |
| screw speed | rpm | 57.7 | 57.8 | 57.7 | 55.2 | 55.2 | 54.9 | 55.4 |

The pipes were subjected to pressure tests. The results of the pressure tests are shown in Table 5.

TABLE 5

Pressure tests on pipes

| | IE1 | IE2 | IE3 | IE4 | IE5 | CE1 | CE2 |
|---|---|---|---|---|---|---|---|
| 7.0 MPa, 80° C. [h] | 70 | 34 | 6 | 26 | 36 | | |
| 7.0 MPa, 80° C. [h] | 46 | 29 | 6 | 27 | 28 | | |
| 6.8 MPa, 80° C. [h] | 171 | 158 | 91 | 204 | 115 | | |
| 6.8 MPa, 80° C. [h] | 265 | 139 | 110 | 177 | 171 | | |
| 6.4 MPa, 80° C. [h] | 2468 | | | | | | |
| 6.4 MPa, 80° C. [h] | 1709 | | | | | | |
| 6.2 MPa, 80° C. [h] | 5068 | | | | | 221 | 310 |
| 6.2 MPa, 80° C. [h] | 4450 | | | | | 225 | 300 |

The invention claimed is:

1. A polyethylene composition comprising:
a base resin, which is a polymeric part of the polyethylene composition without fillers, having a density of from 953.0 kg/m³ to 960.0 kg/m³, determined according to ISO 1183, wherein
the polyethylene composition has a melt flow rate $MFR_{21}$ (190° C., 21.16 kg), of from 1.0 to 7.5 g/10 min, determined according to ISO 1133, a complex viscosity at a frequency of 0.05 rad/s $eta_{0.05}$ of from 750 kPa·s to 1900 kPa's, determined according to ISO 6721-1 and ISO 6721-10, a white spot rating of 3.0 to 12.0, determined according to ISO 18553, after a single compounding step in a twin screw extruder at an extruder temperature before die plate of 200° C. to 300° C. and a specific energy input SEI of 200 kwh/ton to 350 kWh/ton, a weight average molecular weight Mw of 300 kg/mol to 600 kg/mol, determined by GPC, a molecular weight distribution Mw/Mn of from 30 to 65, and a tensile modulus of 1200 MPa to 2000 MPa, determined according to ISO 527-2:1993.

2. The polyethylene composition according to claim 1, wherein the base resin comprises an ethylene copolymer having ethylene monomer units and comonomer units selected from at least one alpha-olefin having from 4 to 12 carbon atoms.

3. The polyethylene composition according to claim 1, wherein the polyethylene composition has a content of comonomer units selected from at least one alpha-olefin having from 4 to 12 carbon atoms, of from 0.01 to 0.50 mol %, based on the total molar amount of monomer units in the polyethylene composition.

4. The polyethylene composition according to claim 1 having a weight average molecular weight Mw of from 380 kg/mol to 500 kg/mol, determined by GPC.

5. The polyethylene composition according to claim 1 having a z average molecular weight Mz of from 1200 kg/mol to 3000 kg/mol, determined by GPC.

6. The polyethylene composition according to claim 1 having a polydispersity index PI of from 2.5 $Pa^{-1}$ to 7.5 $Pa^{-1}$, determined according to ISO 6721-1 and ISO 6721-10.

7. The polyethylene composition according to claim 1, wherein the base resin comprises at least four ethylene homo- or copolymer fractions (A), (B), (C) and (D),
wherein fractions (A) and (B), (C) are all an ethylene homopolymer, and fraction (D) is a copolymer of ethylene and at least one alpha-olefin comonomer with 4 to 12 carbon atoms,
whereby the combined fractions (A) and (B) have a melt flow rate $MFR_2$ (190° C., 2.16 kg) of 5.0 to 250 g/10 min,
the combined fractions (A), (B) and (C) have a melt flow rate $MFR_2$ (190° C., 2.16 kg) of 80 to 250 g/10 min and
wherein fraction (A) is present in an amount of 0.5 to 10 wt.-% with respect to the base resin,
and combined fractions (A), (B) and (C) are present in an amount of 35 to 70 wt.-% with respect to the base resin.

8. A polyethylene composition of claim 1 obtainable by a multistage process, the multistage process comprising the following steps:
a) polymerizing ethylene in the presence of a solid Ziegler-Natta catalyst component in a first reactor for obtaining a first intermediate material,
b) transferring the first intermediate material to a second reactor
  (i) feeding ethylene to the second reactor
  (ii) further polymerizing the first intermediate material for obtaining a second intermediate material, the second intermediate material having a melt flow rate $MFR_2$ (190° C., 2.16 kg) of 5.0 to 250 g/10 min; and
c) transferring the second intermediate material to a third reactor
  (i) feeding ethylene to the third reactor
  (ii) further polymerizing the second intermediate material for obtaining a third intermediate material, the third intermediate material having a melt flow rate $MFR_2$ (190° C., 2.16 kg) of 80 to 250 g/10 min;
d) transferring the third intermediate material to a fourth reactor (i) feeding ethylene and comonomer selected from alpha-olefins having from 4 to 12 carbon atoms to the fourth reactor
(ii) further polymerizing the third intermediate material in the presence of a silane type external donor
for obtaining a base resin having density of from 953.0 kg/m³ to 960.0 kg/m³, determined according to ISO 1183, and
e) extruding the base resin into a polyethylene composition having a melt flow rate $MFR_{21}$ (190° C., 21.16 kg), of from 1.0 to 7.5 g/10 min, determined according to ISO 1133, a complex viscosity at a frequency of 0.05 rad/s $eta_{0.05}$ of from 750 kPa·s to 1900 kPa·s, determined according to ISO 6721-1 and ISO 6721-10, a white spot rating of 3.0 to 12.0, determined according to ISO 18553, after a single compounding step in a twin screw extruder temperature before die plate of 200° C. to 300° C. and a specific energy input SEI of 200 kWh/ton to 350 kWh/ton, a weight average molecular weight Mw of from 300 kg/mol to 600 kg/mol, determined by GPC, a molecular weight distribution Mw/Mn of from 30 to 65, and a tensile modulus of 1200 MPa to 2000 MPa, determined according to ISO 527-2:1993.

9. A process for producing the polyethylene composition according to claim 1, wherein the base resin is polymerized in a multistage process in at least four sequential reactor stages in any order in the presence of a solid Ziegler-Natta catalyst component.

10. The process according to claim 9, wherein the multistage process comprises the following steps:
(a) polymerizing ethylene in the presence of the solid Ziegler-Natta catalyst component in a first reactor for obtaining a first intermediate material,
(b) transferring the first intermediate material to a second reactor
(i) feeding ethylene to the second reactor
(ii) further polymerizing the first intermediate material for obtaining a second intermediate material, the second intermediate material having a melt flow rate $MFR_2$ (190° C., 2.16 kg) of 5 to 250 g/10 min; and
(c) transferring the second intermediate material to a third reactor
(i) feeding ethylene to the third reactor
(ii) further polymerizing the second intermediate material for obtaining a third intermediate material, the third intermediate material having a melt flow rate $MFR_2$ (190° C., 2.16 kg) of 80 to 250 g/10 min;
(d) transferring the third intermediate material to a fourth reactor
(i) feeding ethylene and comonomer selected from alpha-olefins having from 4 to 12 carbon atoms to the fourth reactor
(ii) further polymerizing the third intermediate material in the presence of a silane type external donor
for obtaining a base resin having density of from 953.0 kg/m³ to 960.0 kg/m³, determined according to ISO 1183, and
(e) extruding the base resin into a polyethylene composition.

11. The process according to claim 9 wherein the solid Ziegler-Natta catalyst component is a solid $MgCl_2$ supported catalyst component comprising an internal organic compound of formula (I) or isomers or mixtures therefrom

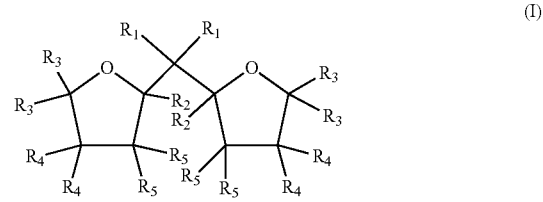

and
wherein in the formula (I)
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring,
the two oxygen-containing rings are individually saturated or partially unsaturated or unsaturated.

12. The process according to claim 9 wherein the solid Ziegler-Natta catalyst is pre-polymerized with one or more olefin monomer(s) selected from C2, C3 or C4 olefin monomers and mixtures thereof to obtain a pre-polymerized solid Ziegler-Natta catalyst before the first polymerization step (a).

13. An article comprising the polyethylene composition according to claim 1.

14. The article according to claim 13 being a pipe or pipe fitting.

15. The article according to claim 13 being a pipe which has a pressure resistance of at least 100 h, determined according to ISO 1167-1:2006 at a hoop stress of 6.8 MPa at a temperature of 80° C., and/or a pressure resistance of at least 2000 h, determined according to ISO 1167-1:2006 at a hoop stress of 6.2 MPa at a temperature of 80° C.

* * * * *